US012519268B2

(12) United States Patent
Kadoyama et al.

(10) Patent No.: US 12,519,268 B2
(45) Date of Patent: Jan. 6, 2026

(54) PANEL ATTACHMENT CONNECTOR

(71) Applicant: SUMITOMO WIRING SYSTEMS, LTD., Mie (JP)

(72) Inventors: Taiga Kadoyama, Mie (JP); Yuma Mamiya, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 310 days.

(21) Appl. No.: 18/282,628

(22) PCT Filed: Mar. 7, 2022

(86) PCT No.: PCT/JP2022/009660
§ 371 (c)(1),
(2) Date: Sep. 18, 2023

(87) PCT Pub. No.: WO2022/202245
PCT Pub. Date: Sep. 29, 2022

(65) Prior Publication Data

US 2024/0170885 A1 May 23, 2024

(30) Foreign Application Priority Data

Mar. 25, 2021 (JP) ................................. 2021-051247

(51) Int. Cl.
*H01R 13/52* (2006.01)
*H01R 13/24* (2006.01)
(Continued)

(52) U.S. Cl.
CPC ..... *H01R 13/5202* (2013.01); *H01R 13/2407* (2013.01); *H01R 13/434* (2013.01); *H01R 13/74* (2013.01)

(58) Field of Classification Search
CPC ............ H01R 13/5202; H01R 13/2407; H01R 13/434; H01R 13/74
See application file for complete search history.

(56) References Cited

U.S. PATENT DOCUMENTS 5,277,610 A 1/1994 Krehbiel et al.
5,759,064 A 6/1998 Sugiyama
(Continued)

FOREIGN PATENT DOCUMENTS

JP S62-053587 U 4/1987

OTHER PUBLICATIONS

International Search Report issued on Apr. 12, 2022 for WO 2022/202245 A1 (4 pages).

*Primary Examiner* — Sean Gugger
(74) *Attorney, Agent, or Firm* — Venjuris, P.C.

(57) ABSTRACT

A panel attachment connector 10 configured to be attached to a panel 1 including a connector attachment hole 2 that has a circular shape in a front view includes a housing 20 and a seal ring 80. A panel fitting portion 30 includes a lock receiving portion 31 that receives a lock protrusion 5 and a seal attachment portion 32 to which the seal ring 80 is attached. The seal attachment portion 32 includes a first seal surface 35 and a second seal surface 36. The seal ring 80 is compressed between an inner circumferential surface of a panel hood 3 and the first seal surface 35 and between a rear end portion of the panel hood 3 and the second seal surface 36. An outer circumferential surface of the lock receiving portion 31 is continuous to and flush with the first seal surface 35.

2 Claims, 23 Drawing Sheets

(51) Int. Cl.
*H01R 13/434* (2006.01)
*H01R 13/74* (2006.01)

(56) References Cited

U.S. PATENT DOCUMENTS

| | | | | |
|---|---|---|---|---|
| 5,769,555 | A * | 6/1998 | Okada ................ | H01R 13/4365 439/378 |
| 6,083,040 | A | 7/2000 | Mosquera | |
| 7,090,533 | B1 | 8/2006 | Houck et al. | |
| 2009/0258544 | A1 | 10/2009 | Allwood | |
| 2015/0011108 | A1 | 1/2015 | Vanslambrouck et al. | |
| 2015/0079839 | A1* | 3/2015 | Takemura .............. | H01R 13/74 439/559 |

* cited by examiner

PANEL ATTACHMENT CONNECTOR

CROSS REFERENCE TO RELATED APPLICATIONS

This application is a national phase of PCT application No. PCT/JP2022/009660, filed on 7 Mar. 2022, which claims priority from Japanese patent application No. 2021-051247, filed on 25 Mar. 2021, all of which are incorporated herein by reference.

TECHNICAL FIELD

The present disclosure relates to a panel attachment connector.

BACKGROUND

As a panel attachment connector that is attached to a panel constituting the body or a door of an automobile, a connector described in JP 2015-520474 A (Patent Document 1 shown below) is known, for example. This connector includes an insertion portion at one end portion thereof, an outer portion at another end portion thereof, and an intermediate portion between the insertion portion and the outer portion. The insertion portion has a circular wall that forms a cylindrical shape, and an engagement member is provided on an outer surface of the circular wall. On the other hand, a slot into which the engagement member enters is provided in an opening of the panel, and an engagement lip is provided next to the slot in the panel. When the insertion portion of the connector is inserted into the opening and is rotated, the engagement member and the engagement lip engage, and thus the connector is fixed to the panel.

The intermediate portion includes a flange that extends radially outward over the entire circumference of the intermediate portion. An annular surface is provided on the inner side in the radial direction of the flange, and a channel is provided on the outer side in the radial direction of the flange. An annular sealing gasket is arranged in the channel. The annular sealing gasket waterproofs the inner side of the panel by being compressed in the radial direction between an inner wall constituting an inner circumferential surface of the channel and an annular rib provided on the panel.

PRIOR ART DOCUMENT

Patent Document

Patent Document 1: JP 2015-520474 A

SUMMARY OF THE INVENTION

Problems to be Solved

In the connector described above, the channel in which the annular sealing gasket is arranged is provided on the outer circumferential surface side of the circular wall, and accordingly, the annular sealing gasket is larger than the connector provided on the outer surface of the circular wall. If the configuration is changed in such a manner that the annular sealing gasket is arranged on the outer surface of the circular wall, the position of the engagement member needs to be changed to a position other than the outer surface of the circular wall, and a sufficient consideration has not been given to downsizing of the connector. Also, even if wobbling in the radial direction can be suppressed by the sealing structure constituted by the annular sealing gasket and the channel, wobbling in an axial direction cannot be suppressed, and therefore, it cannot be said that wobbling can be sufficiently suppressed by the structure. Also, consideration has not been given to the influence on waterproof performance.

Means to Solve the Problem

A panel attachment connector according to the present disclosure is configured to be attached to a panel including a connector attachment hole that has a circular shape in a front view, the panel attachment connector including a housing and a seal ring. The panel includes a panel hood protruding backward from an outer circumferential edge of the connector attachment hole and a lock protrusion protruding radially inward from an inner wall that constitutes the connector attachment hole. The housing includes a panel fitting portion that fits to the inner wall of the connector attachment hole and a connector hood protruding forward from the panel fitting portion. The panel fitting portion includes a lock receiving portion configured to receive the lock protrusion and a seal attachment portion to which the seal ring is attached. The seal attachment portion includes a first seal surface and a second seal surface. The seal ring is compressed between an inner circumferential surface of the panel hood and the first seal surface and between a rear end portion of the panel hood and the second seal surface. An outer circumferential surface of the lock receiving portion is continuous to and flush with the first seal surface. The lock protrusion and the lock receiving portion come into contact with each other due to elasticity of the compressed seal ring. The housing is fixed to the panel due to a frictional force acting between the lock protrusion and the lock receiving portion.

Effect of the Invention

According to the present disclosure, it is possible to suppress wobbling and downsize a housing while securing high waterproof performance.

DETAILED DESCRIPTION TO EXECUTE THE INVENTION

Figure 1:
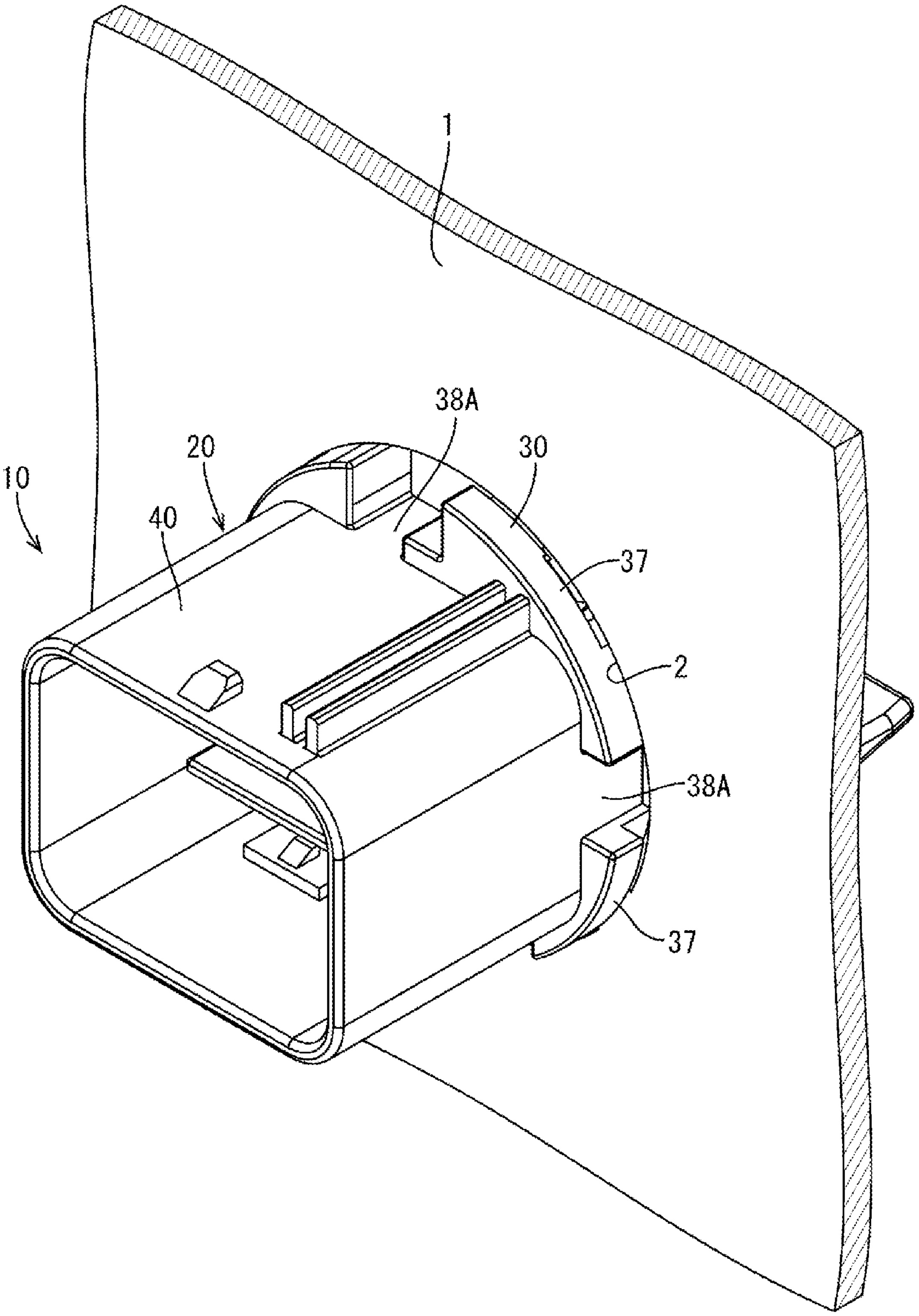
FIG. 1 is a perspective view of a panel attachment connector at an attachment completion position as viewed obliquely from the front.

Description of Embodiments of the Present Disclosure

A panel attachment connector according to the present disclosure is configured as described below.

(1) A panel attachment connector is configured to be attached to a panel including a connector attachment hole that has a circular shape in a front view, the panel attachment connector including a housing and a seal ring. The panel includes a panel hood protruding backward from an outer circumferential edge of the connector attachment hole and a lock protrusion protruding radially inward from an inner wall that constitutes the connector attachment hole. The housing includes a panel fitting portion that fits to the inner wall of the connector attachment hole and a connector hood protruding forward from the panel fitting portion. The panel fitting portion includes a lock receiving portion configured to receive the lock protrusion and a seal attachment portion to which the seal ring is attached. The seal attachment portion includes a first seal surface and a second seal surface. The seal ring is compressed between an inner circumferential surface of the panel hood and the first seal surface and between a rear end portion of the panel hood and the second seal surface. An outer circumferential surface of the lock receiving portion is continuous to and flush with the first seal surface. The lock protrusion and the lock receiving portion come into contact with each other due to elasticity of the compressed seal ring. The housing is fixed to the panel due to a frictional force acting between the lock protrusion and the lock receiving portion.

The seal ring serves as a shaft seal by being compressed between the first seal surface and the inner circumferential surface of the panel hood, and also serves as a face seal by being compressed between the second seal surface and the rear end portion of the panel hood. High waterproof performance can be thus obtained by the combination of the shaft seal and the face seal. Also, wobbling can be suppressed because the lock protrusion and the lock receiving portion come into contact with each other due to elasticity of the compressed seal ring. Furthermore, the outer circumferential surface of the lock receiving portion is continuous to and flush with the first seal surface, and accordingly, the lock receiving portion is within the height range of the first seal surface, and the housing can be downsized.

(2) In a preferable configuration, the housing is rotatable relative to the panel between an attachment start position and an attachment completion position, one of the lock protrusion and the lock receiving portion includes an engagement portion, and the other of the lock protrusion and the lock receiving portion includes an engaged portion configured to engage with the engagement portion to suppress rotation of the housing from the attachment completion position toward the attachment start position.

The housing is kept at the attachment completion position by a frictional force acting between the lock protrusion and the lock receiving portion, but the housing may rotate from the attachment completion position toward the attachment start position when a force larger than the frictional force is applied to the housing. Therefore, the engagement portion is provided in one of the lock protrusion and the lock receiving portion and the engaged portion is provided in the other of the lock protrusion and the lock receiving portion to suppress rotation of the housing toward the attachment start position through engagement between the engagement portion and the engaged portion.

(3) In a preferable configuration, the panel fitting portion has a circular shape in the front view, the connector hood has a rectangular shape in the front view, a diagonal dimension of the connector hood in the front view is not larger than a diameter of the panel fitting portion and is almost the same as the diameter of the panel fitting portion, an outer surface of the connector hood includes four flat surfaces and four curved surfaces connecting the flat surfaces, the lock receiving portion includes an entrance that allows the lock protrusion to pass therethrough to arrange the housing at the attachment start position, and the entrance is provided at a position corresponding to any of the flat surfaces in the front view.

The diagonal dimension of the connector hood is not larger than the diameter of the panel fitting portion and is almost the same as the diameter of the panel fitting portion. With this configuration, it is possible to downsize the panel fitting portion as far as possible. Also, the entrance of the lock receiving portion is provided at a position corresponding to any of the flat surfaces of the connector hood in the front view. Therefore, it is possible to provide the entrance of the lock receiving portion by effectively using a region between the flat surface of the connector hood and the outer circumferential surface of the lock receiving portion.

(4) In a preferable configuration, the housing is configured to be inserted into the connector attachment hole from behind, and to be fixed to the panel in such a manner that the connector hood protrudes forward from the panel.

When the housing is inserted into the connector attachment hole from behind, the housing can be kept from falling off to the front of the connector attachment hole.

Details of Embodiments of the Present Disclosure

The following describes a specific example of a panel attachment connector 10 according to the present disclosure with reference to the drawings. Note that the present disclosure is not limited to the following examples, but is defined by the claims, and is intended to encompass all modifications within the meanings and the scope equivalent to the claims.

Configuration of Panel Attachment Connector

Figure 18:
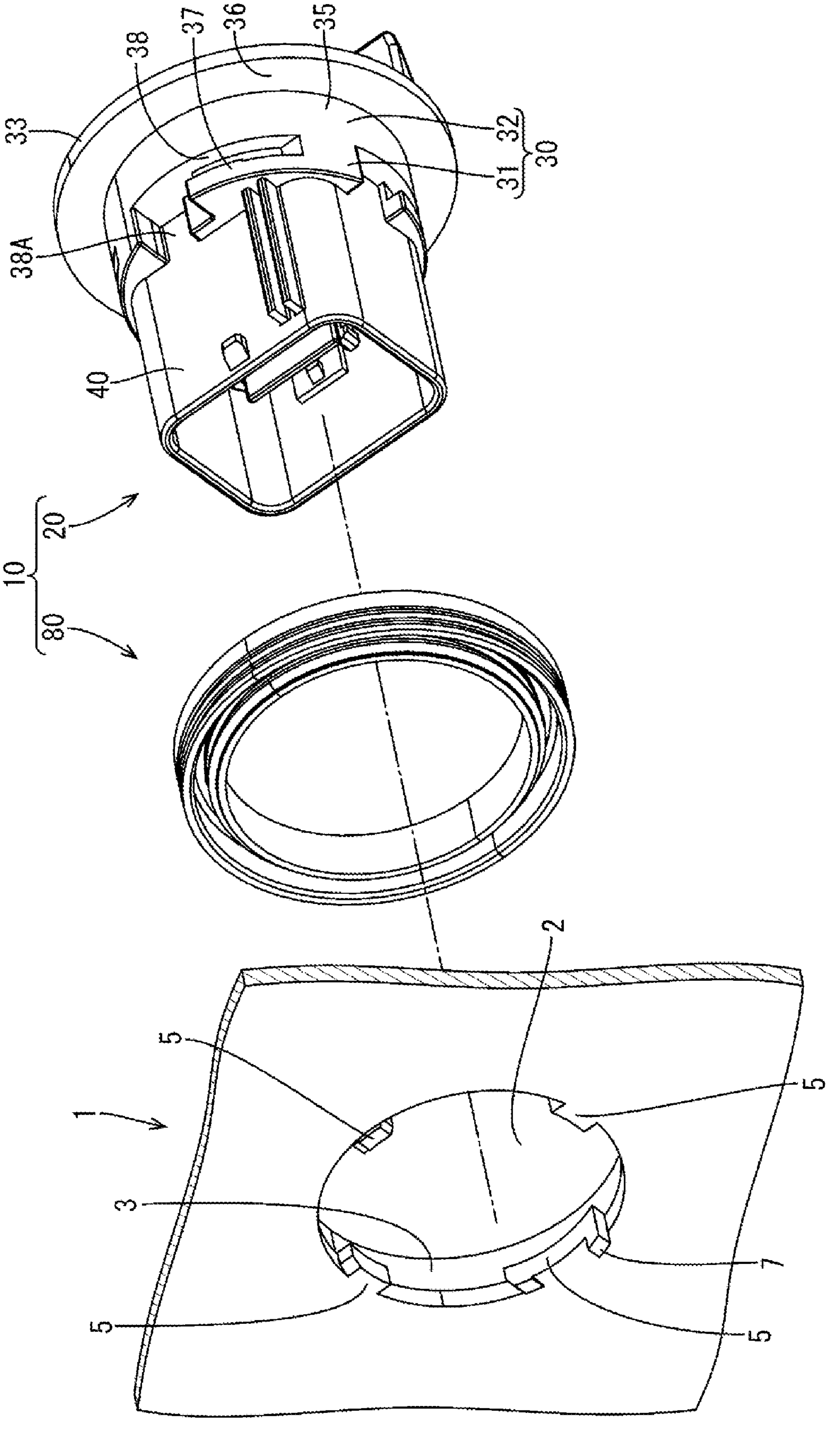
FIG. 18 is an exploded perspective view showing components of the panel attachment connector as viewed diagonally from the front.
Figure 19:
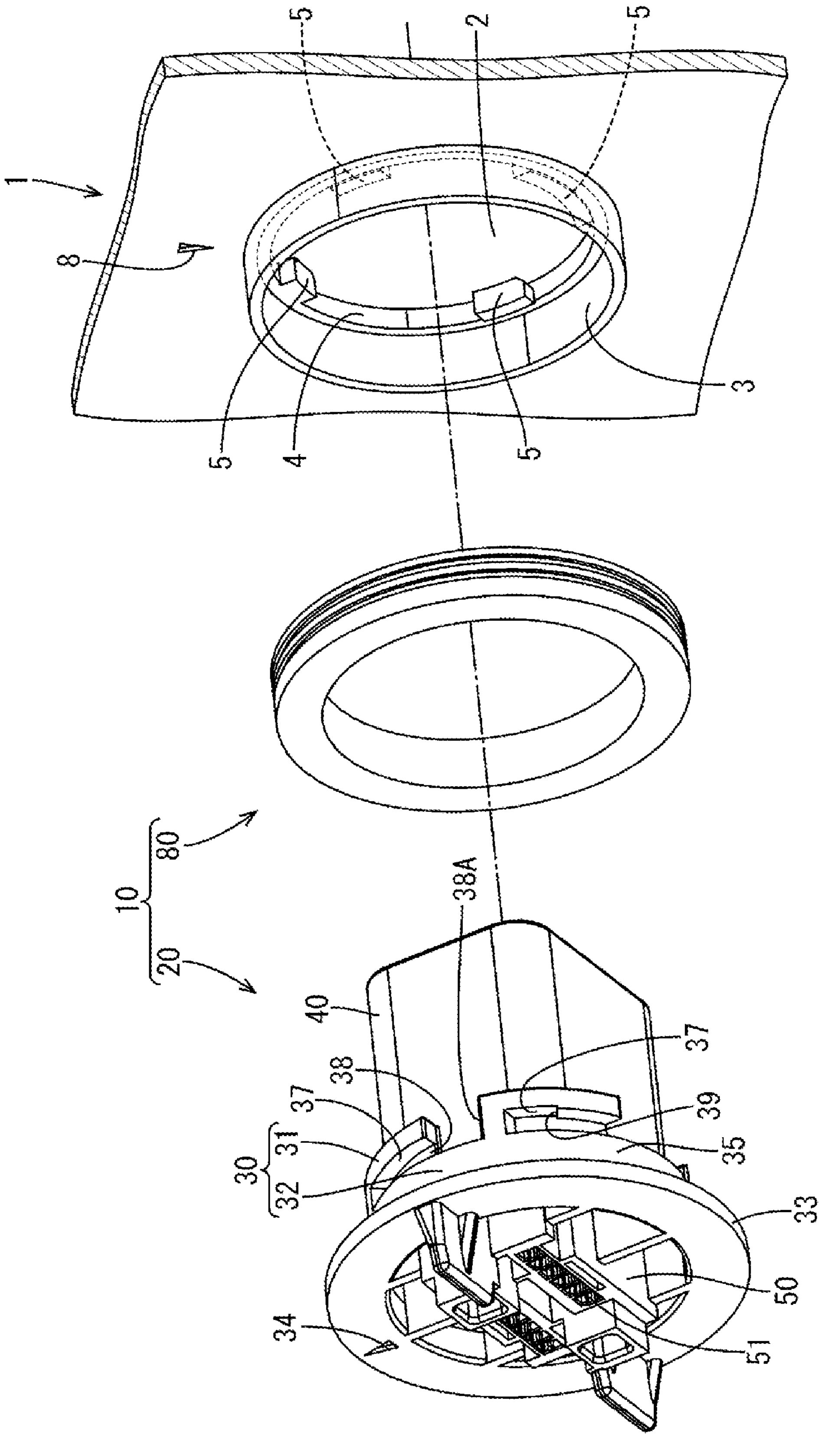
FIG. 19 is an exploded perspective view showing components of the panel attachment connector as viewed diagonally from the back.

The panel attachment connector 10 according to the present disclosure is configured to be attached to a panel 1 and includes a housing 20 and a seal ring 80 as shown in FIGS. 18 and 19. A connector attachment hole 2 is provided in the panel 1. The panel attachment connector 10 is a waiting connector that is attached to the panel 1 in advance by being inserted into the connector attachment hole 2. The panel attachment connector 10 is inserted into the connector attachment hole 2 from behind, and is attached to the panel 1 by being rotated clockwise as viewed from the back. The back side referred to here is the right side of the panel 1 shown in FIG. 5, and the panel attachment connector 10 is inserted from the right side toward the left side of the panel 1 shown in FIG. 5.

Configuration of Panel

Figure 20:
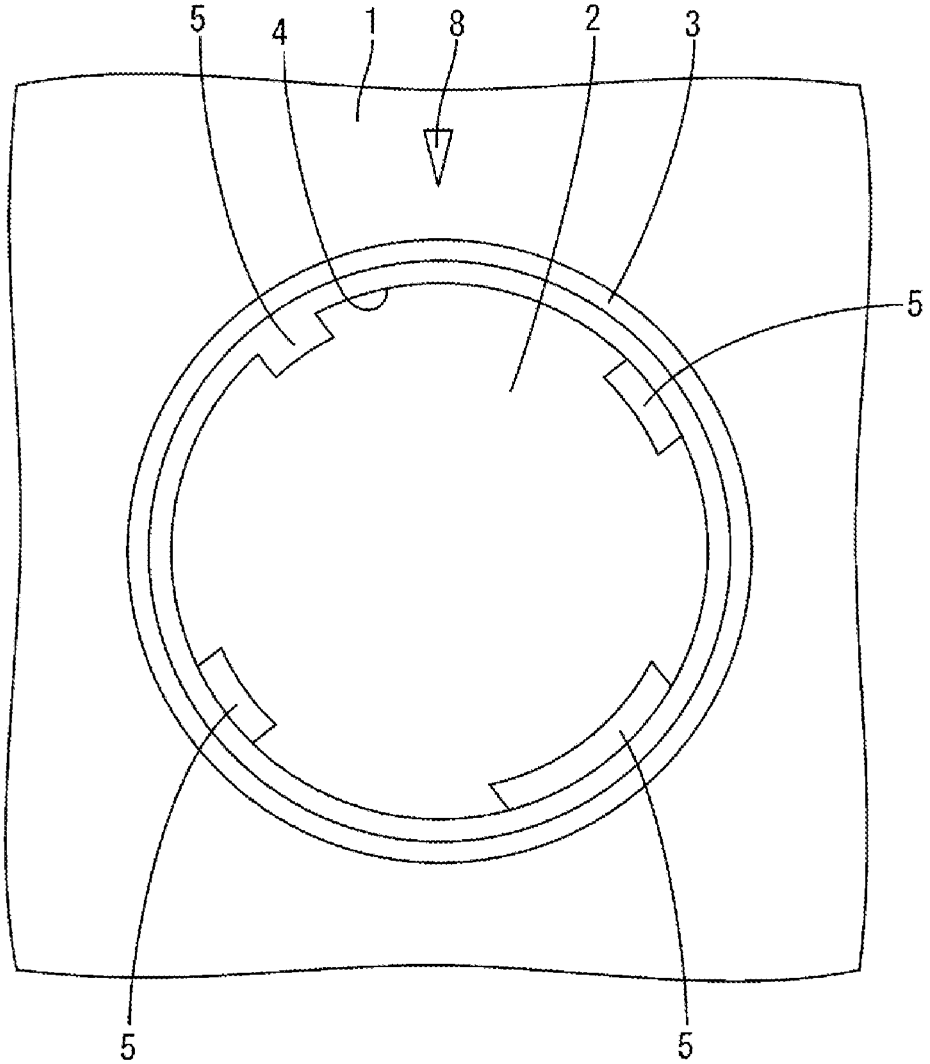
FIG. 20 is a rear view of a panel.

As shown in FIG. 19, the panel 1 includes a panel hood 3 protruding backward from an outer circumferential edge of the connector attachment hole 2 and a plurality of lock protrusions 5 protruding radially inward from an inner wall 4 that constitutes the connector attachment hole 2. As shown in FIG. 20, the panel hood 3 has a cylindrical shape in a rear view and is coaxial with the connector attachment hole 2. The plurality of lock protrusions 5 protrude radially inward toward the center of the connector attachment hole 2 and are arranged at equal angular intervals. In the present embodiment, the panel is provided with four lock protrusions 5 that have different shapes in order to avoid incorrect connection.

As shown in FIG. 18, an upper right lock protrusion 5 in a front view includes an engagement portion 6 that slightly protrudes forward. A lower left lock protrusion 5 in a front view includes an engagement portion 6 that slightly protrudes forward and a rotation stopper 7 that substantially protrudes forward. The lower left lock protrusion 5 extends in the circumferential direction in parallel with the inner wall 4 of the connector attachment hole 2. The engagement portion 6 is provided at an end of the lock protrusion 5 in the circumferential direction, and the rotation stopper 7 is provided at the other end of the lock protrusion 5 in the circumferential direction.

Configuration of Seal Ring

Figure 12:
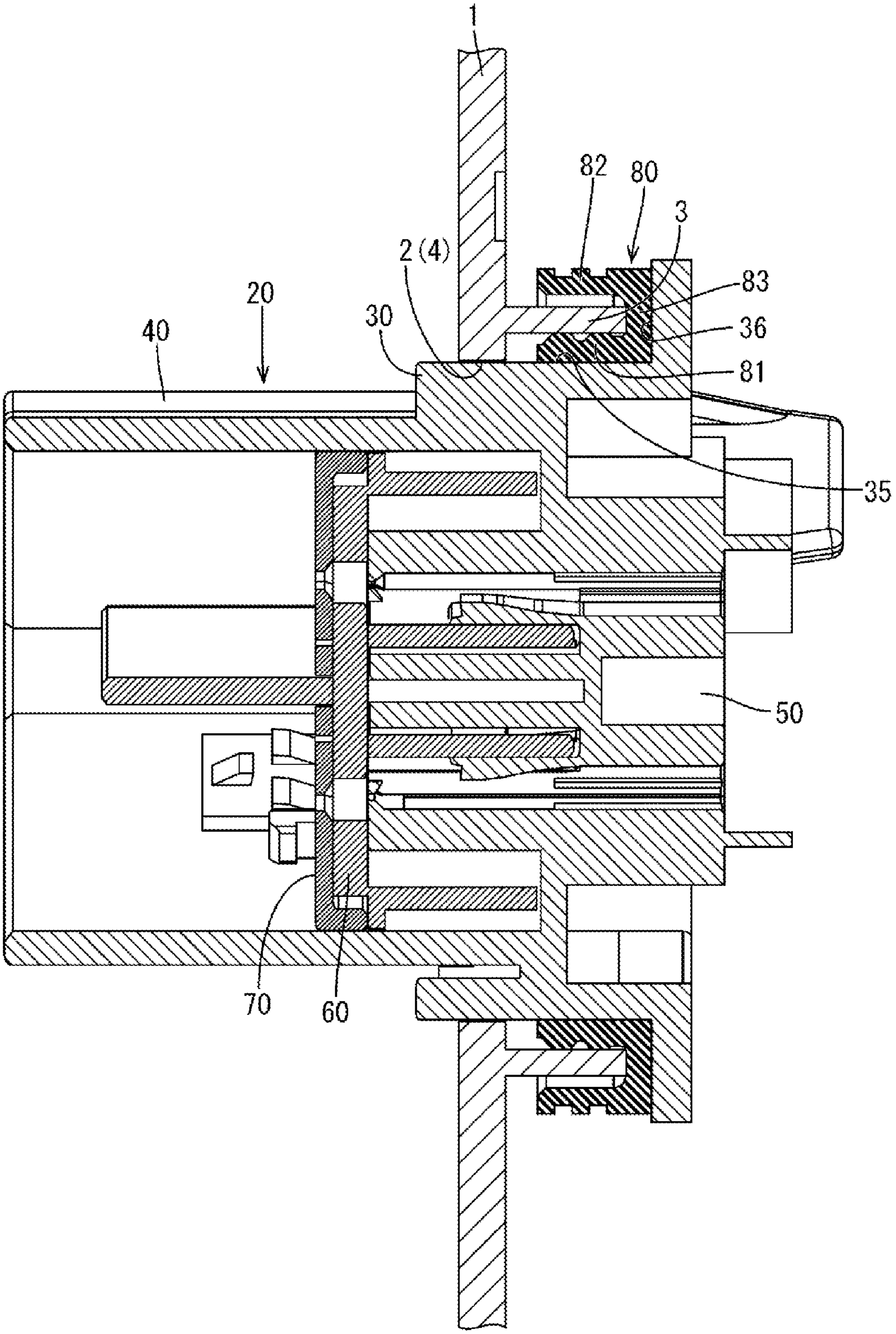
FIG. 12 is a cross-sectional view taken along the line E-E shown in FIG. 11.

The seal ring 80 is an elastic member made of rubber or the like, and has a double circular tube shape. The seal ring 80 includes a shaft seal 81 that constitutes an inner circumferential surface of the double tube shape, a protective wall 82 that constitutes an outer circumferential surface of the double tube shape, and a face seal 83 connecting a rear end of the shaft seal 81 and a rear end of the protective wall 82. The face seal 83 extends over the entire circumference. As shown in FIG. 12, a cross section of the seal ring 80 has a shape including an opening that is formed by the shaft seal 81, the face seal 83, and the protective wall 82 and is open forward.

A plurality of lips 84 are provided on an outer circumferential surface of the shaft seal 81. The lips 84 extend in the circumferential direction over the entire circumference. In the present embodiment, two lips 84 are provided in parallel with each other and spaced apart from each other in an axial direction (see FIGS. 5 and 6).

Configuration of Housing

Figure 5:
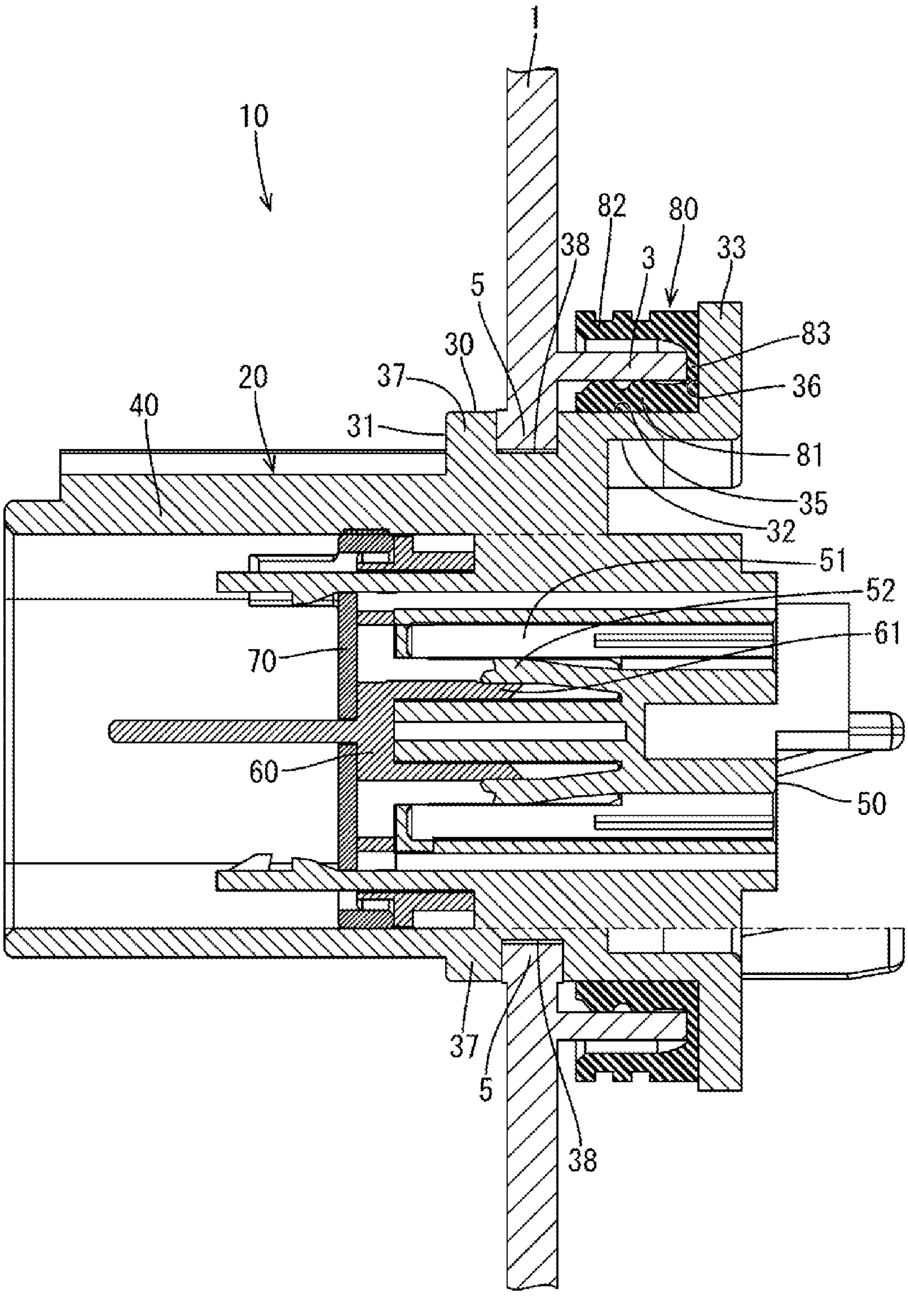
FIG. 5 is a cross-sectional view taken along the line A-A shown in FIG. 3.

As shown in FIG. 5, the housing 20 includes a panel fitting portion 30 that fits to the inner wall 4 of the connector attachment hole 2, a connector hood 40 protruding forward from the panel fitting portion 30, and a terminal housing portion 50 that houses a terminal (not shown). The housing 20 is made of a synthetic resin, and the panel fitting portion 30, the connector hood 40, and the terminal housing portion 50 are formed as a single piece.

Configuration of Connector Hood

Figure 3:
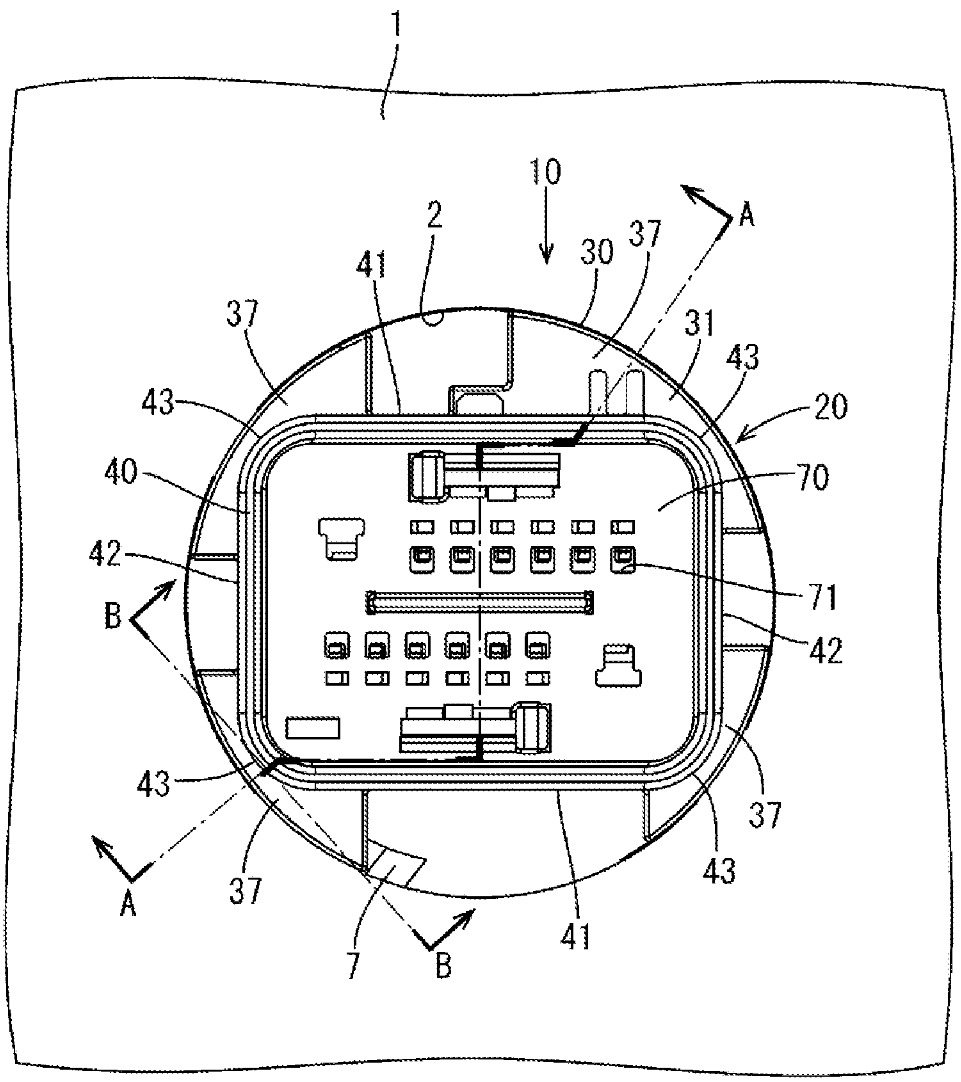
FIG. 3 is a front view of the panel attachment connector at the attachment completion position.

The connector hood 40 is open forward and has a laterally elongated rectangular shape in a front view as shown in FIG. 1. A mating connector (not shown) can be fitted into the connector hood 40. As shown in FIG. 3, an outer surface of the connector hood 40 includes first flat surfaces 41 corresponding to two long sides opposite to each other, second flat surfaces 42 corresponding to two short sides opposite to each other, and four curved surfaces 43 connecting the flat surfaces 41 and 42.

As shown in FIG. 3, the panel fitting portion 30 has a circular shape in a front view. The diameter of the panel fitting portion 30 is slightly larger than the diagonal dimension of the connector hood 40 (the length between two curved surfaces 43 forming opposite corners). In other words, the diagonal dimension of the connector hood 40 is not larger than the diameter of the panel fitting portion 30 and is almost the same as the diameter of the panel fitting portion 30.

If the diameter of the panel fitting portion is smaller than the diagonal dimension of the connector hood, the inner diameter of the connector attachment hole is accordingly reduced, and the connector hood cannot be inserted into the connector attachment hole from behind. It can be said that the panel fitting portion 30 is downsized as far as possible while allowing the connector hood 40 to be inserted into the connector attachment hole 2 from behind.

Configuration of Terminal Housing Portion

As shown in FIG. 5, the terminal housing portion 50 includes a cavity 51 for housing the terminal (not shown). A lance 52 is provided on an inner wall that constitutes the cavity 51. The lance 52 protrudes forward in a cantilever manner. A front end portion of the terminal housing portion 50 protrudes forward from an innermost wall of the connector hood 40. A front retainer 60 is attached to the protruding portion. The front retainer 60 includes a lock piece 61 that enters a space toward which the lance 52 warps. The lance 52 is kept from warping by the lock piece 61, and secondary locking of the terminal is realized by the lock piece 61 as well as locking by the lance 52.

A movable plate 70 is attached to a front surface of the front retainer 60. The movable plate 70 is movable in the front-rear direction. The movable plate 70 includes an insertion hole 71 for inserting a tab of the terminal (not shown) (see FIG. 3). The tab is positioned by being inserted into the insertion hole 71, and thus the tab is smoothly fitted and connected to a mating terminal in an initial stage of fitting to the mating connector. In the initial stage of fitting, only a front end portion of the tab extends through the insertion hole 71 of the movable plate 70. The movable plate 70 is pressed backward as the fitting to the mating connector progresses, and reaches the front surface of the front retainer 60 when the fitting is complete.

Configuration of Panel Fitting Portion

As shown in FIG. 5, the panel fitting portion 30 includes a lock receiving portion 31 that fits along the inner wall 4 of the connector attachment hole 2 and a seal attachment portion 32 that enters a space on the inner circumferential surface side of the panel hood 3. The terminal housing portion 50 extends in the front-rear direction inside the panel fitting portion 30. The front end of the terminal housing portion 50 is in front of the front end of the lock receiving portion 31.

Figure 2:
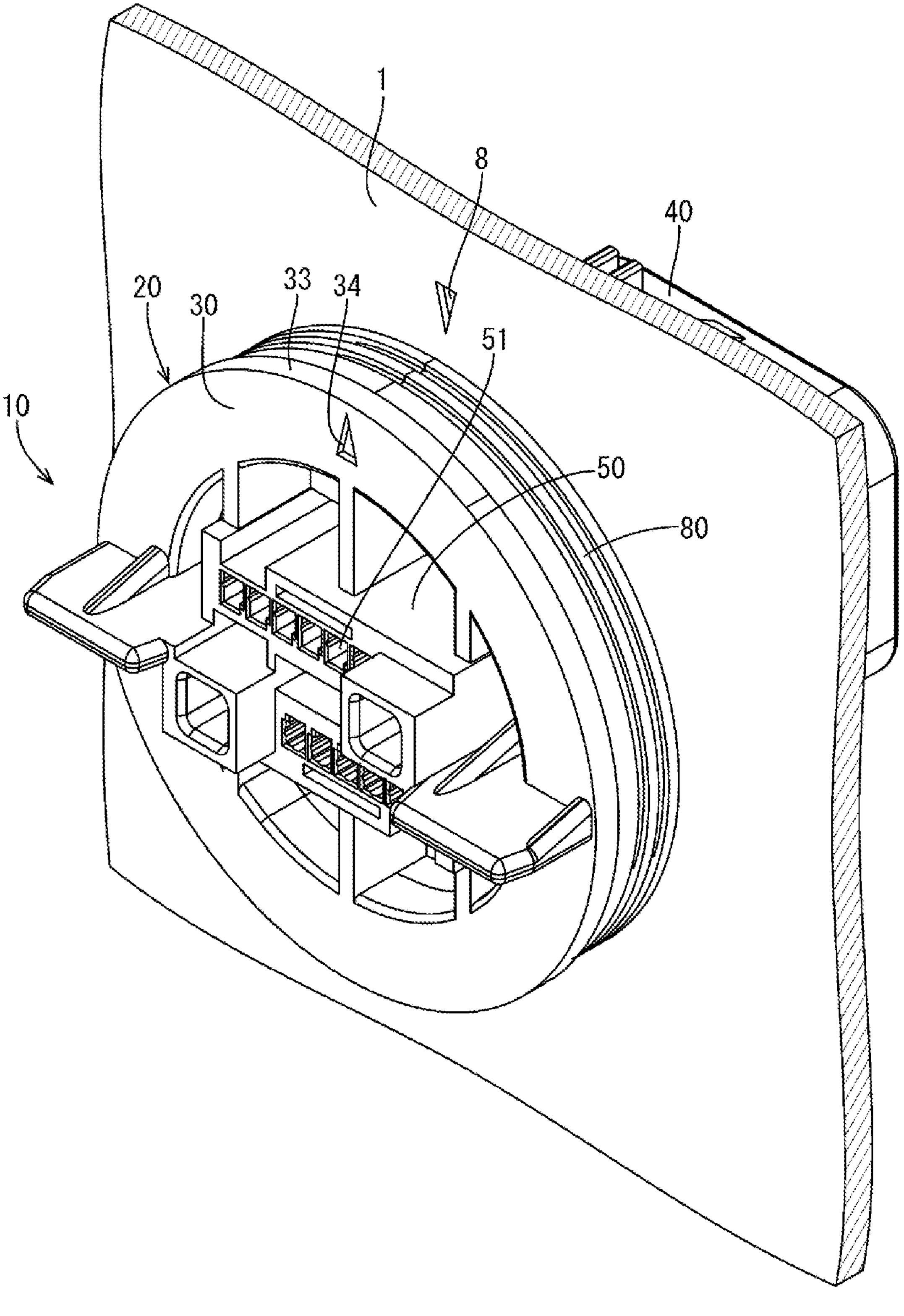
FIG. 2 is a perspective view of the panel attachment connector at the attachment completion position as viewed obliquely from the back.

A flange 33 that protrudes radially outward is provided at the rear end of the seal attachment portion 32. As shown in FIG. 2, the flange 33 extends over the entire circumference. A triangular mark 34 is provided on the rear surface of the flange 33. On the other hand, a triangular mark 8 is provided on the rear surface of the panel 1 as well. When vertexes of the two marks 8 and 34 are aligned and face each other, an operation of rotating the panel attachment connector 10 is complete and a locking operation is complete.

Waterproof Structure of Seal Ring

As shown in FIG. 5, the seal attachment portion 32 includes a first seal surface 35 to which the shaft seal 81 of the seal ring 80 is attached and a second seal surface 36 to which the face seal 83 of the seal ring 80 is attached. The second seal surface 36 is the front surface of the flange 33 and faces a rear end portion of the panel hood 3.

Figure 6:
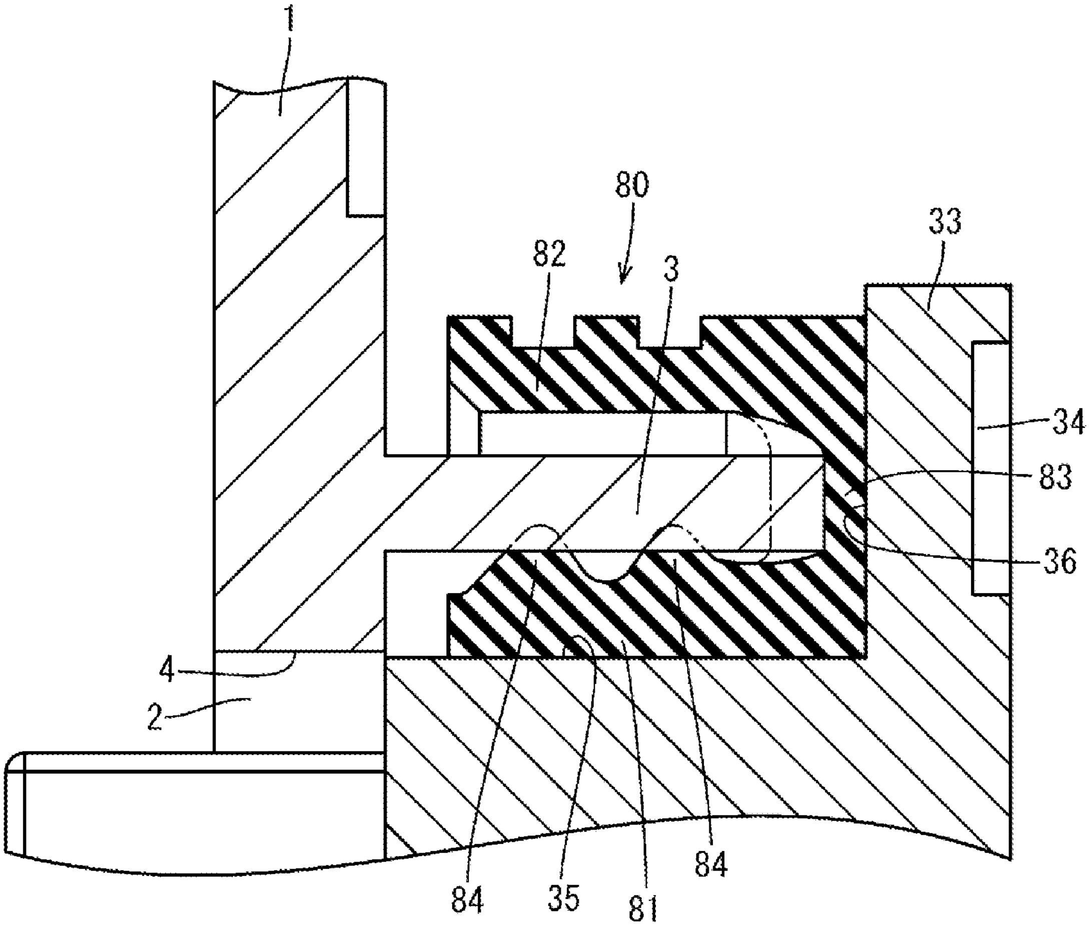
FIG. 6 is an enlarged cross-sectional view of a portion shown in FIG. 5.

The two-dot chain line shown in FIG. 6 shows the shape of the seal ring 80 before the seal ring 80 is compressed. In a state where the panel attachment connector 10 is attached to the panel 1 after the seal ring 80 is attached to the seal attachment portion 32, the shaft seal 81 is compressed between the inner circumferential surface of the panel hood 3 and the first seal surface 35 and the lips 84 are crushed, and the face seal 83 is compressed between the rear end portion of the panel hood 3 and the second seal surface 36.

As a result, both the shaft seal 81 and the face seal 83 contribute to waterproofing, and high waterproof performance such as resistance to high-pressure washing can be exhibited. Furthermore, wobbling in the radial direction is suppressed by elasticity of the compressed shaft seal 81, and wobbling in the front-rear direction (the direction in which the connector and the mating connector are fitted) is suppressed by elasticity of the compressed face seal 83, and accordingly, the seal ring 80 can be kept from falling off and stable waterproof performance can be assured.

The protective wall 82 is spaced apart from the outer circumferential surface of the panel hood 3 and does not contribute to waterproofing, but serves to prevent high-pressure water from directly hitting the face seal 83 at the time of high-pressure washing, for example. Also, in the state before the seal ring 80 is attached to the seal attachment portion 32, the protective wall 82 prevents the shaft seal 81 and the face seal 83 from being exposed and damaged, and prevents foreign matter or the like from attaching to the shaft seal 81 and the face seal 83. The protective wall 82 is on the inner side in the radial direction with respect to an outer circumferential surface of the flange 33 (outer circumferential edge of the second seal surface 36).

Structure for Locking Housing to Panel

As shown in FIG. 18, the lock receiving portion 31 is formed by cutting out a portion of the panel fitting portion 30. A plurality of lock receiving portions 31 are provided at positions corresponding to the lock protrusions 5 of the panel 1. In the present embodiment, four lock receiving portions 31 are provided. Each lock receiving portion 31 includes an abutting portion 37 capable of coming into contact with the corresponding lock protrusion 5 in the front-rear direction and an inlet groove 38 that allows the lock protrusion 5 to move therethrough to a position where the lock protrusion 5 can come into contact with the abutting portion 37. An outer circumferential surface of the lock receiving portion 31 is continuous to and flush with the first seal surface 35. Accordingly, the lock receiving portion 31 is within the height range of the first seal surface 35 and contributes to downsizing the housing 20.

Figure 9:
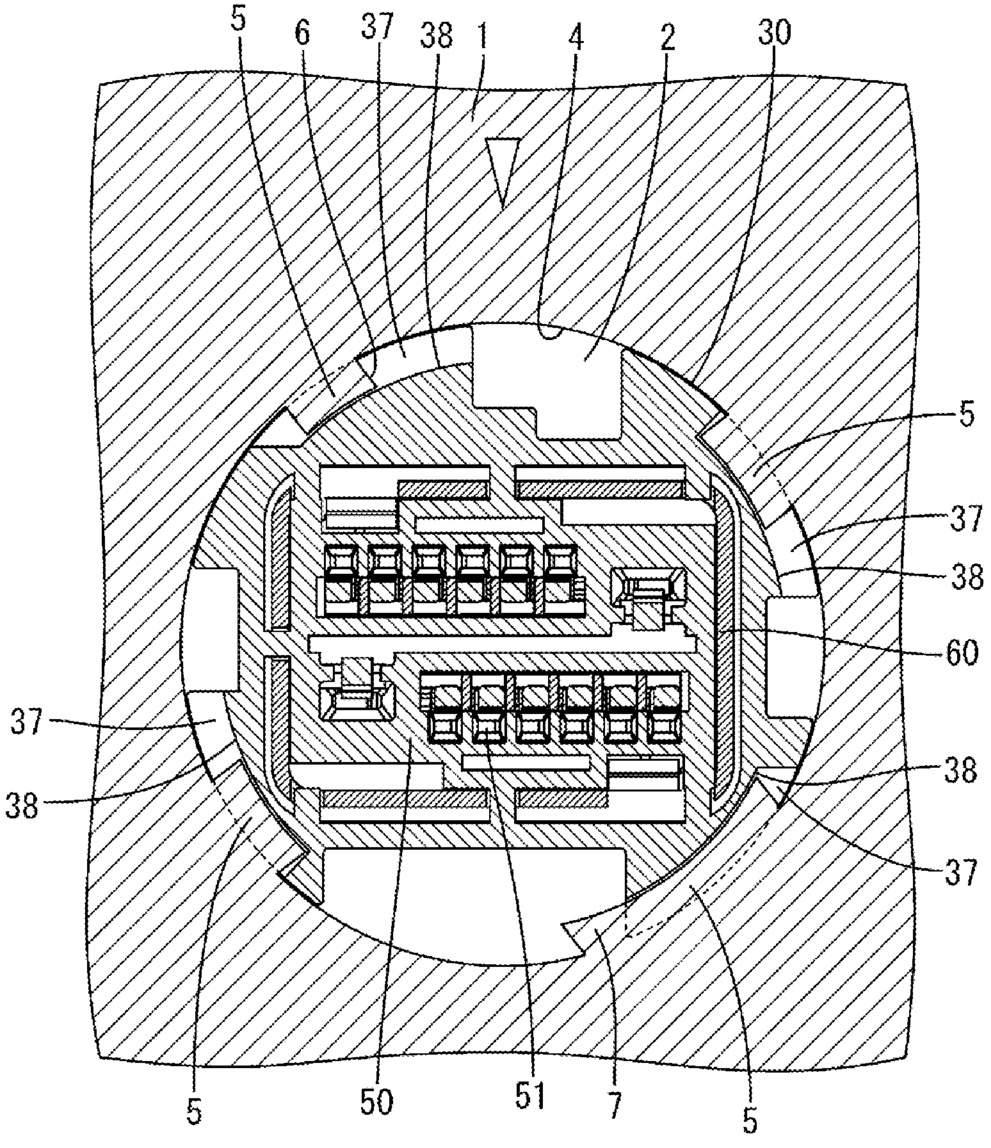
FIG. 9 is a cross-sectional view taken along the line C-C shown in FIG. 8.
Figure 16:
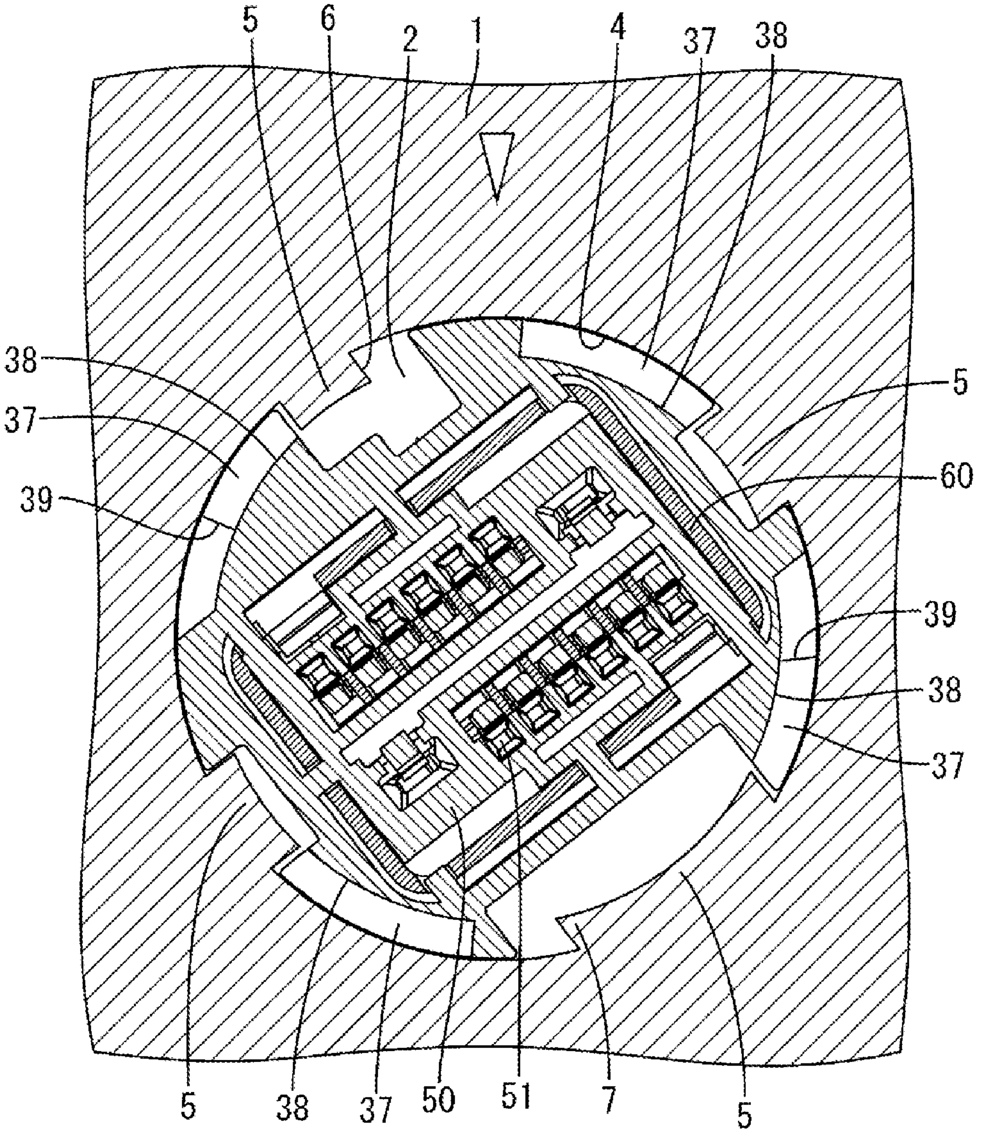
FIG. 16 is a cross-sectional view taken along the line G-G shown in FIG. 15.

The inlet groove 38 extends in the circumferential direction, and an entrance 38A to the inlet groove 38 is open forward. A connector hood 40 side flat surface that constitutes the entrance 38A is continuous to and flush with the first flat surface 41 of the connector hood 40. As shown in FIGS. 9 and 16, each lock protrusion 5 moves from a starting end to a terminal end of the corresponding inlet groove 38 as the housing 20 rotates.

Figure 11:
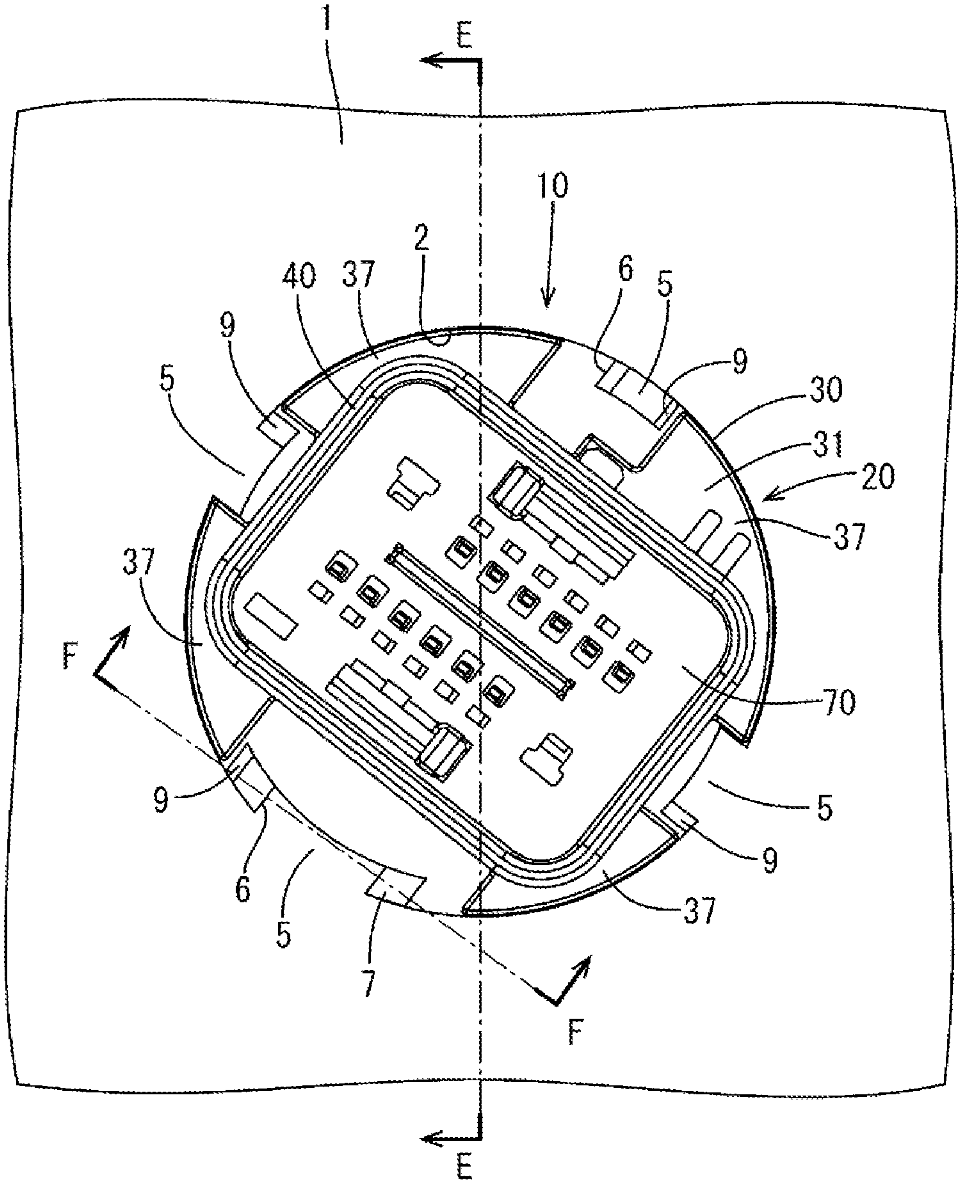
FIG. 11 is a front view of the panel attachment connector at an attachment start position.
Figure 13:
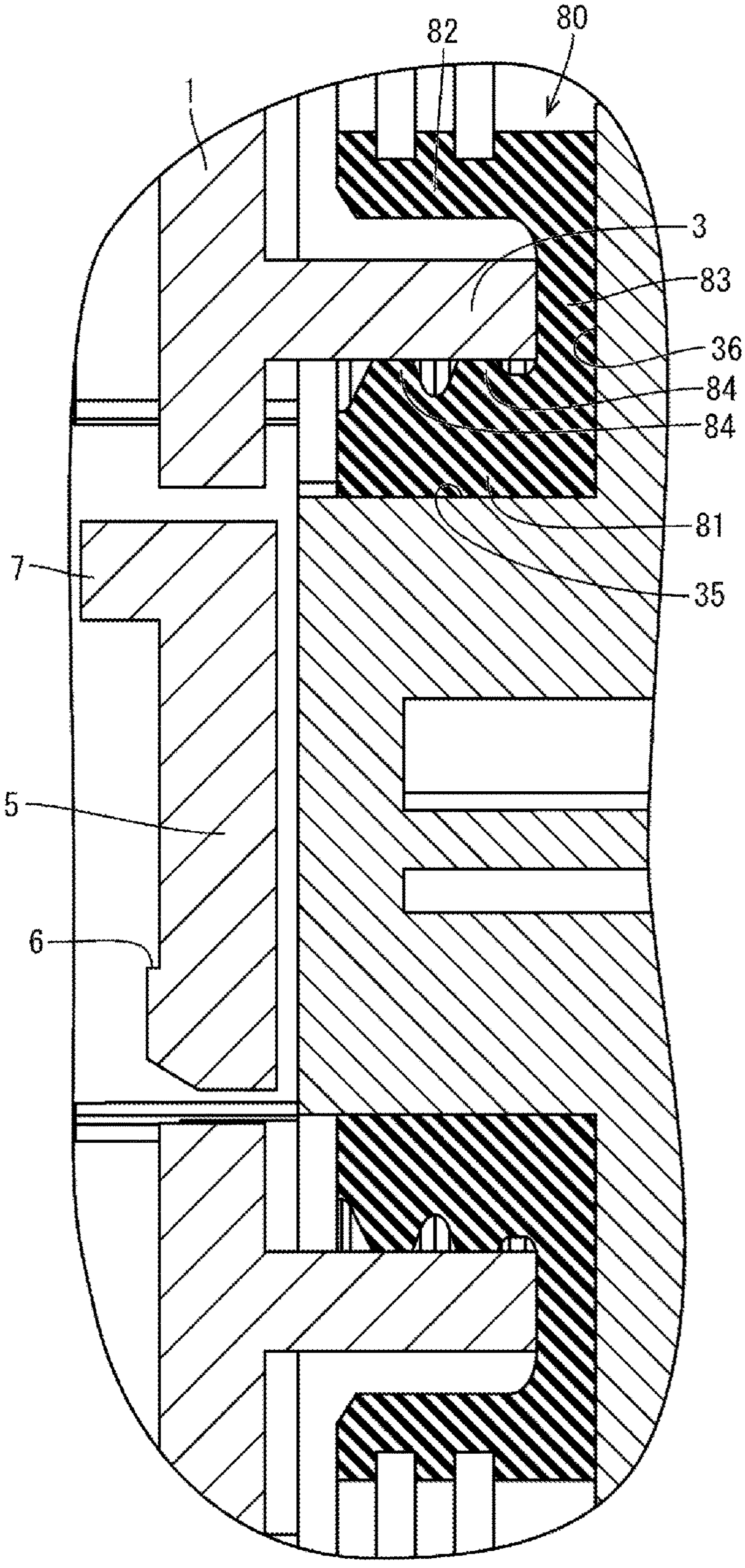
FIG. 13 is a cross-sectional view taken along the line F-F shown in FIG. 11.
Figure 14:
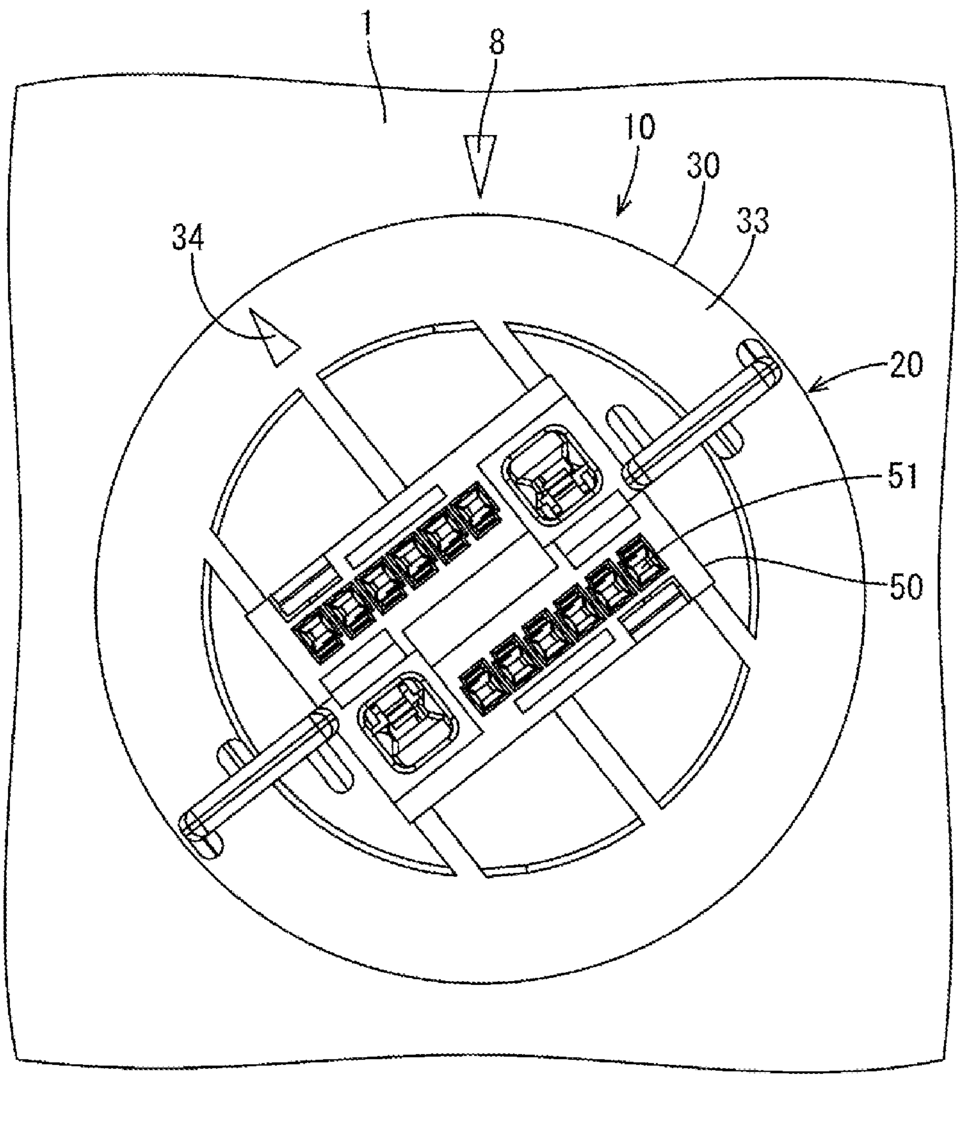
FIG. 14 is a rear view of the panel attachment connector at the attachment start position.

When each lock protrusion 5 of the panel 1 is arranged in the corresponding inlet groove 38 via the entrance 38A in the panel fitting portion 30 as shown in FIG. 16, the housing 20 is located at an attachment start position shown in FIG. 11. At the attachment start position, the face seal 83 of the seal ring 80 is not pressed by the rear end portion of the panel hood 3 as shown in FIG. 13, and the vertexes of the marks 8 and 34 are not aligned as shown in FIG. 14.

In order to rotate the housing 20 from the attachment start position toward an attachment completion position and let the lock protrusions 5 enter the inlet grooves 38, the rear end portion of the panel hood 3 needs to be pressed against the face seal 83. When the lock protrusions 5 enter the inlet grooves 38, the lock protrusions 5 come into contact with the abutting portions 37 from behind due to elasticity of the face seal 83 compressed between the rear end portion of the panel hood 3 and the second seal surface 36, and the lock protrusions 5 slide against the abutting portions 37 as the housing 20 is rotated.

As shown in FIG. 11, the panel 1 includes the engagement portion 6 at an upper right position and the engagement portion 6 at a lower left position in a front view. The lock receiving portions 31 include a pair of engaged portions 39 corresponding to the pair of engagement portions 6 (see FIGS. 17 and 19).

Figure 7:
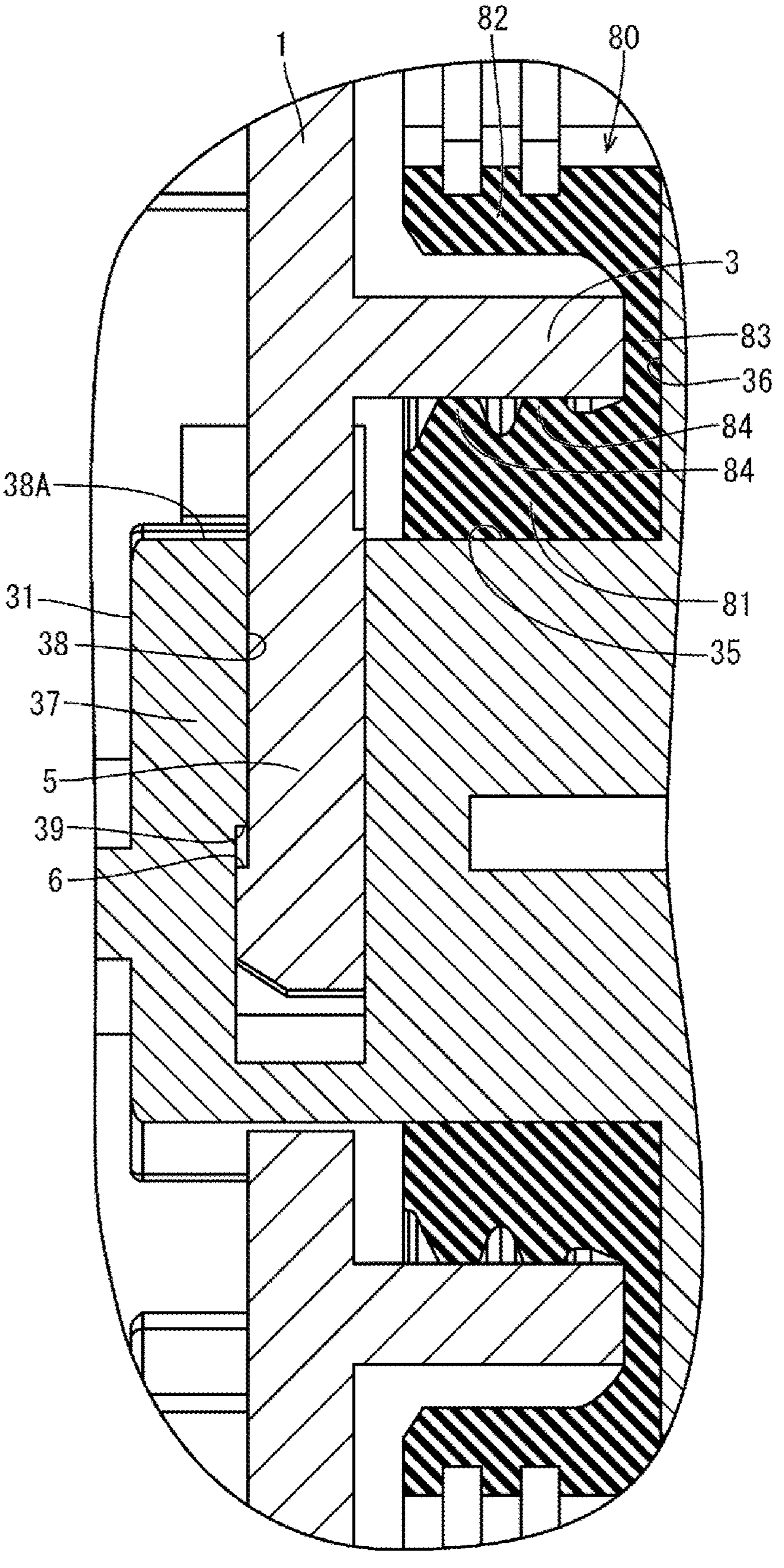
FIG. 7 is a cross-sectional view taken along the line B-B shown in FIG. 3.
Figure 10:
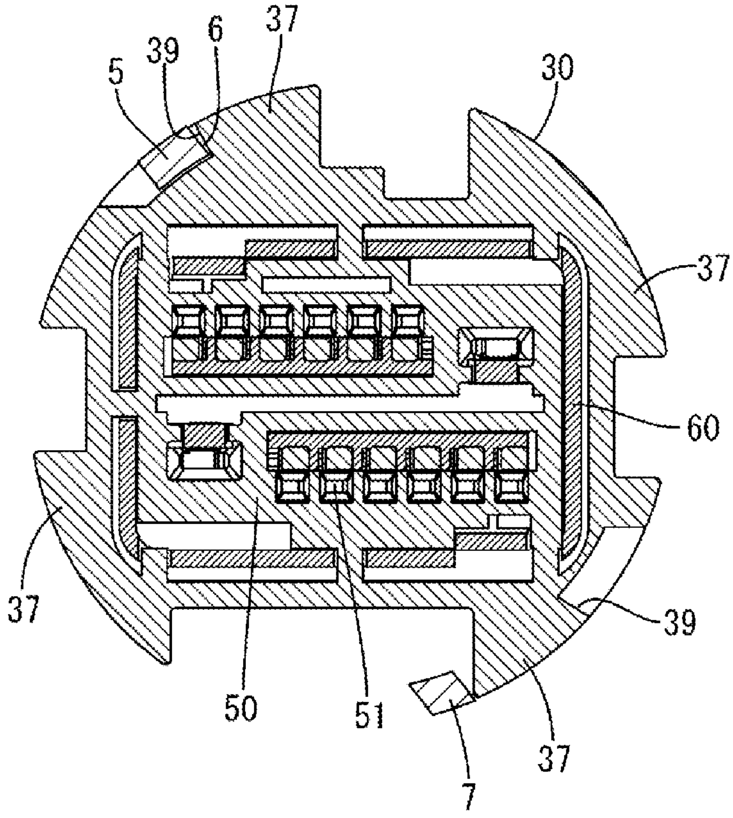
FIG. 10 is a cross-sectional view taken along the line D-D shown in FIG. 8.
Figure 17:
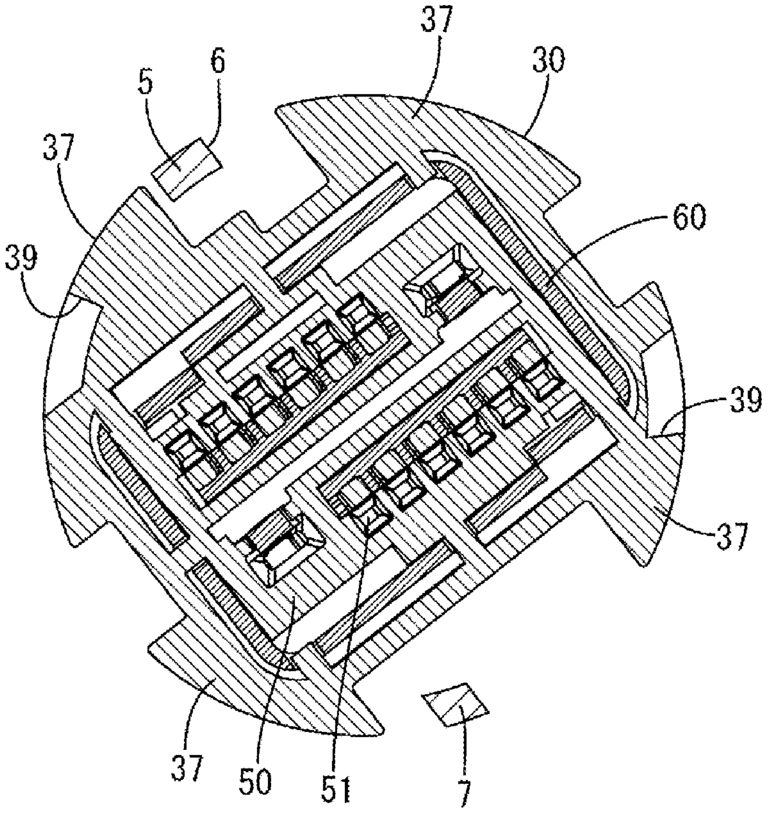
FIG. 17 is a cross-sectional view taken along the line H-H shown in FIG. 15.
Figure 21:
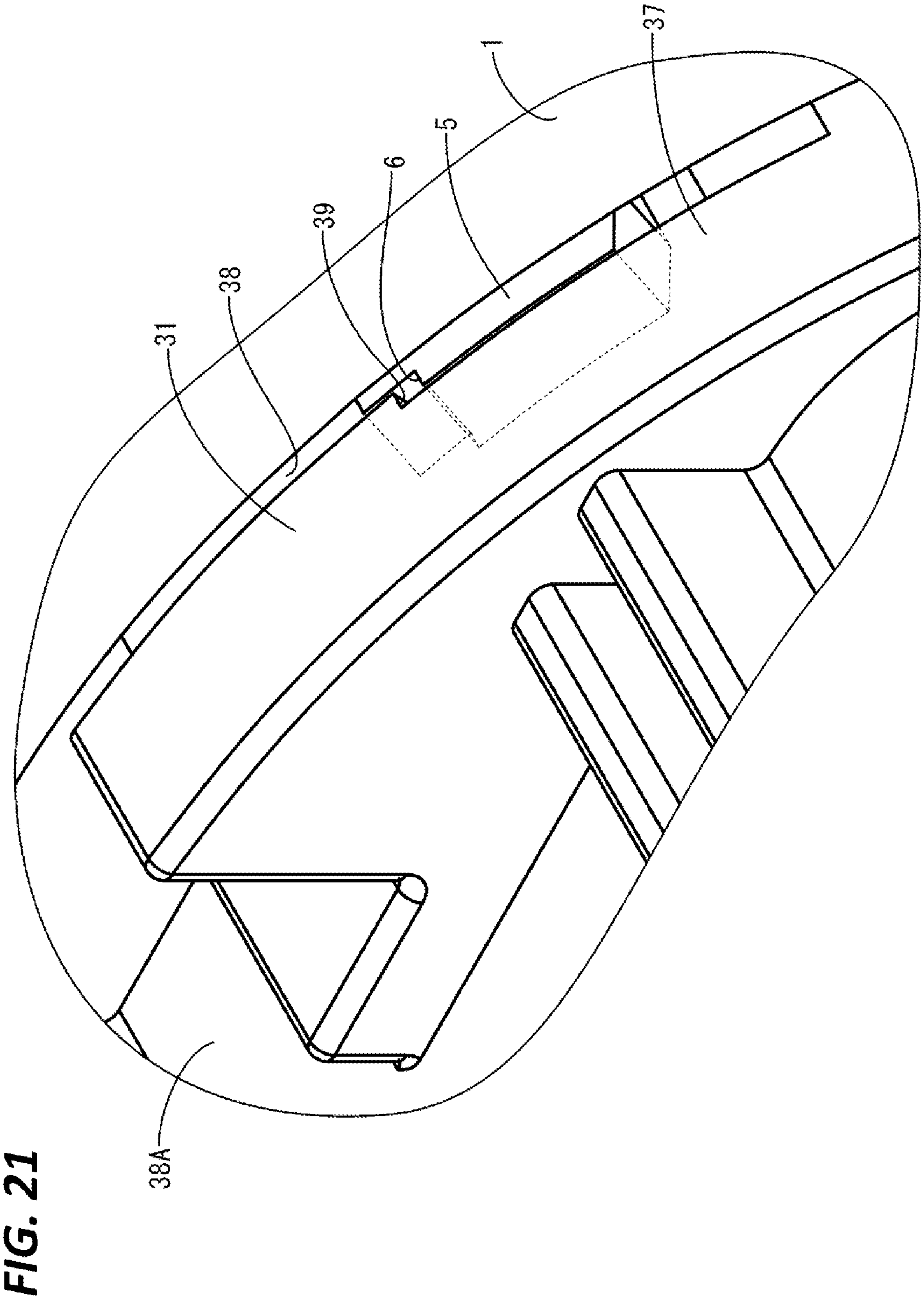
FIG. 21 is an enlarged perspective view showing an engaging structure provided at an upper right position as viewed from the front.

While the housing 20 is moving from the attachment start position shown in FIG. 17 to the attachment completion position shown in FIG. 10, the upper right engagement portion 6 slides on the corresponding abutting portion 37, and when the housing 20 reaches the attachment start position, the engagement portion 6 reaches a position where the engagement portion 6 can engage with the corresponding engaged portion 39 (see FIG. 21). On the other hand, the lower left engagement portion 6 reaches a position where the engagement portion 6 can engage with the corresponding engaged portion 39 as shown in FIGS. 7, 22, and 23.

Figure 15:
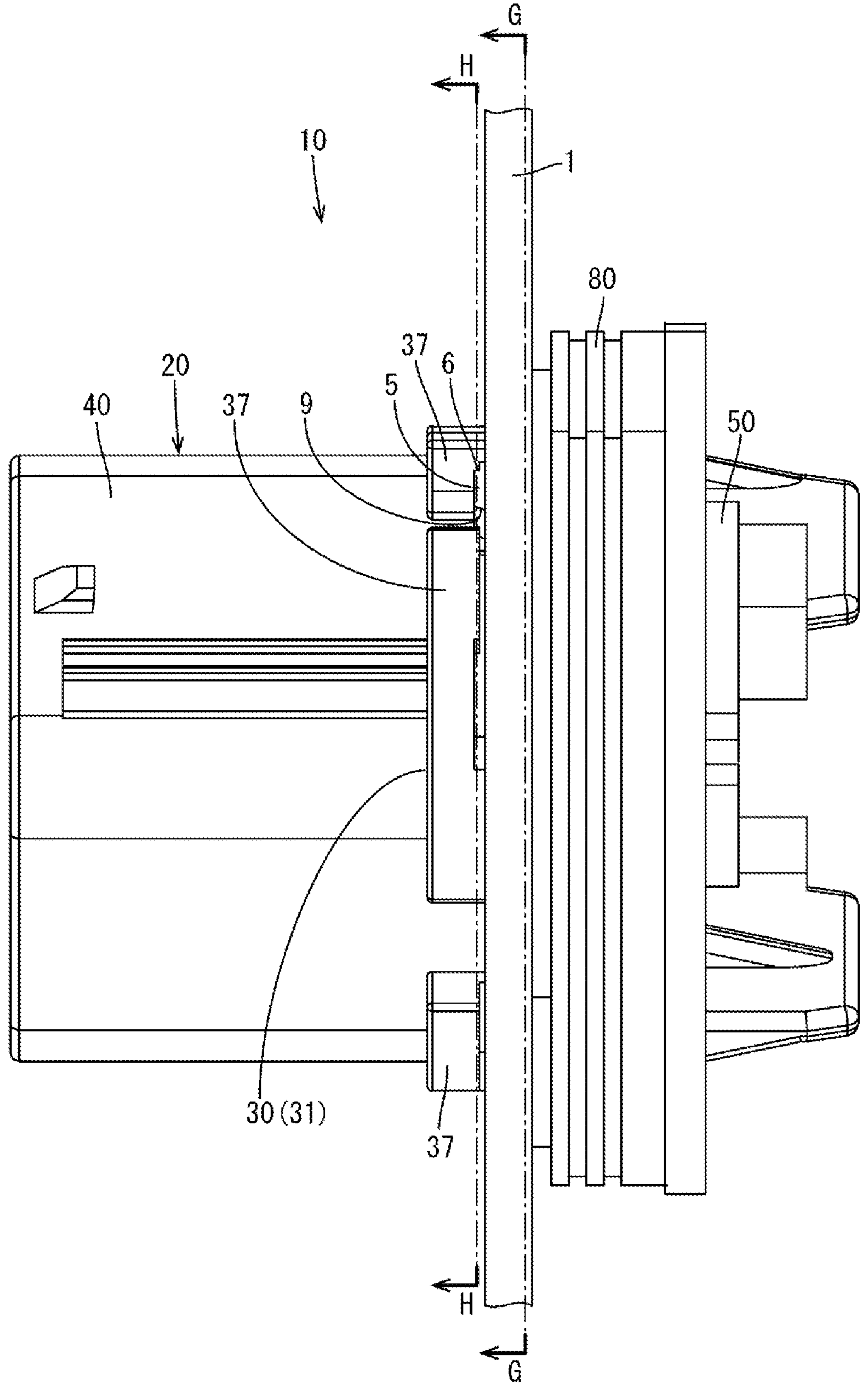
FIG. 15 is a side view of the panel attachment connector at the attachment start position.

A tapered surface 9 is provided at a corner of each engagement portion 6. When the housing 20 is rotated relative to the panel 1, the tapered surface 9 initially slides on the corresponding abutting portion 37, and therefore, the lock protrusions 5 smoothly move onto the abutting portions 37 (see FIG. 15).

Figure 4:
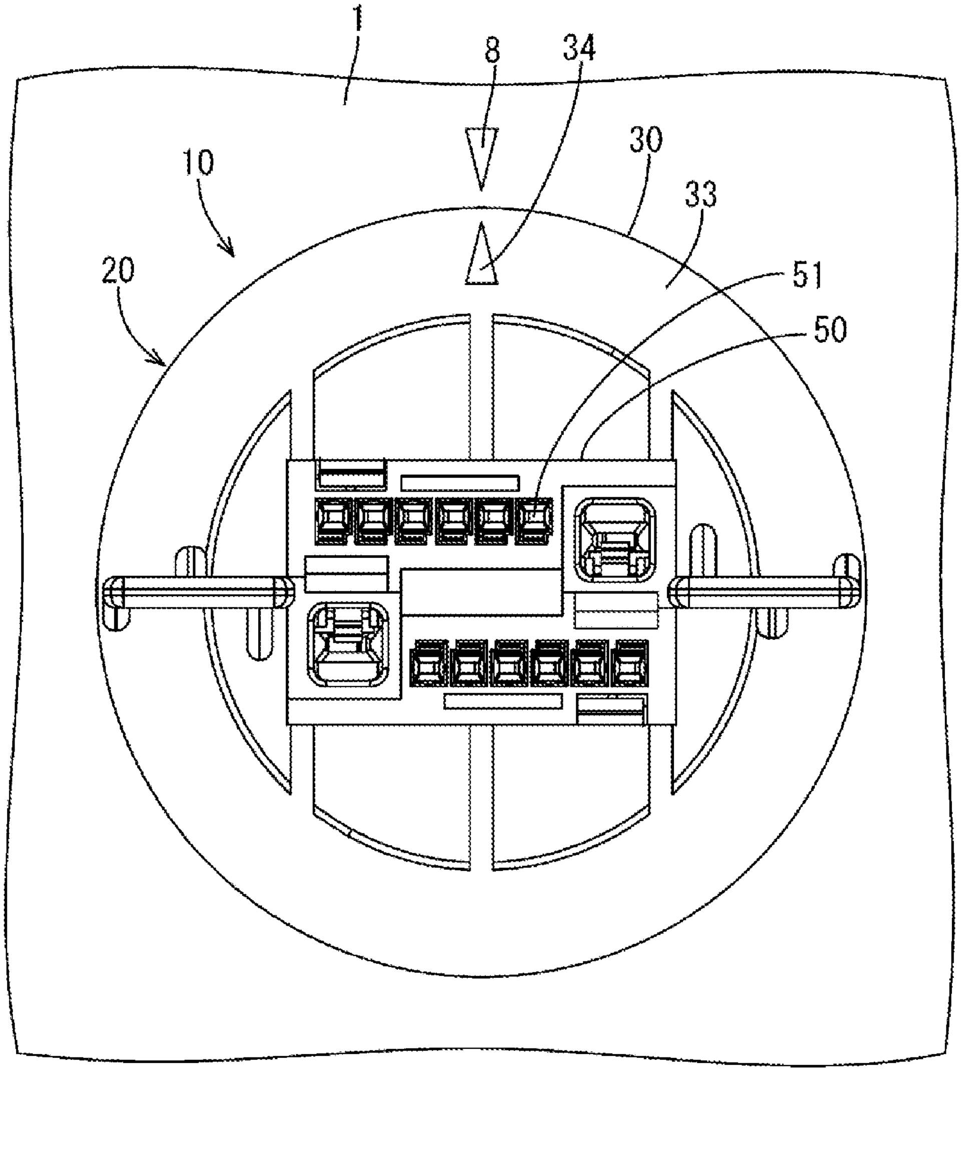
FIG. 4 is a rear view of the panel attachment connector at the attachment completion position.
Figure 8:
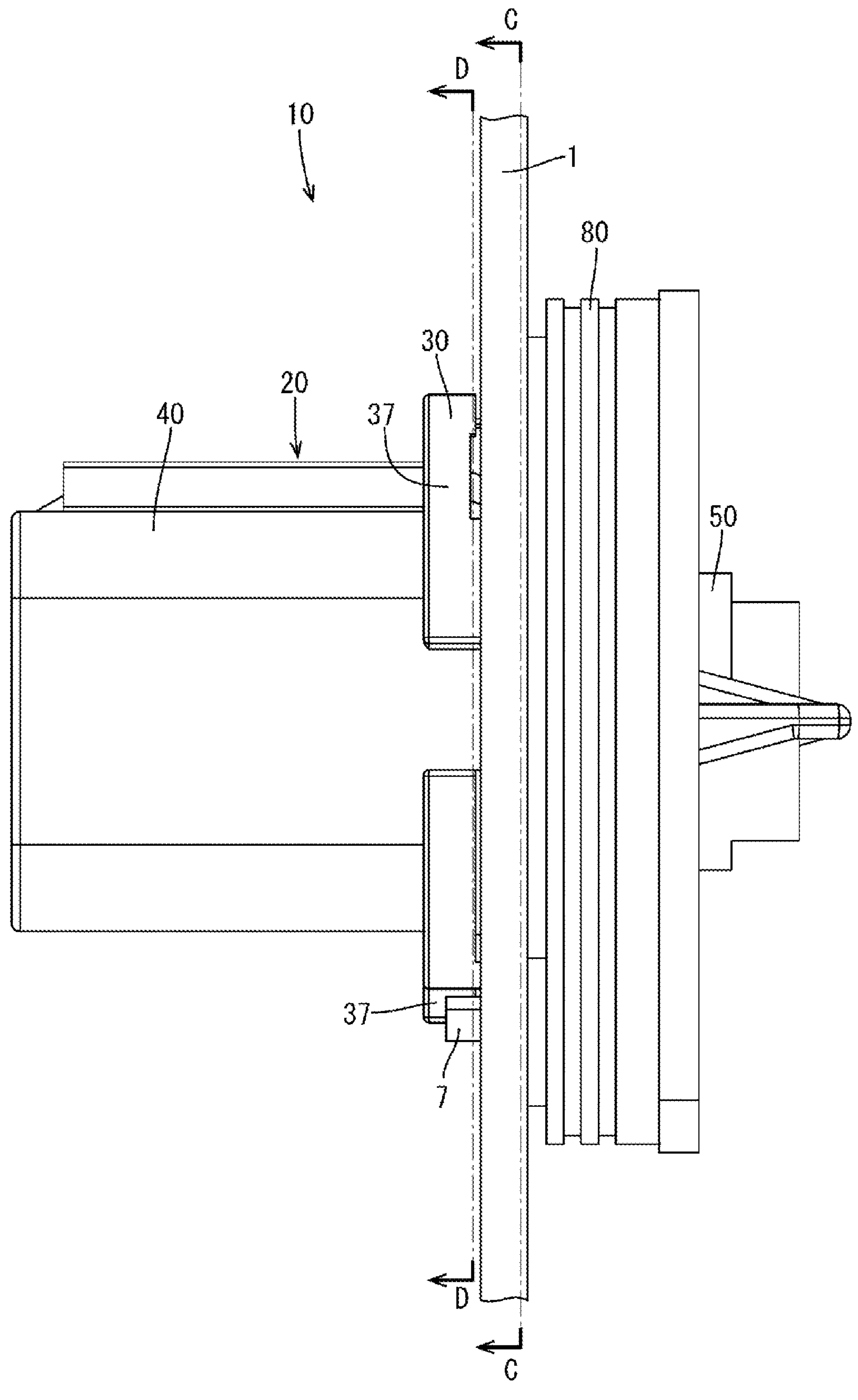
FIG. 8 is a side view of the panel attachment connector at the attachment completion position.
Figure 22:
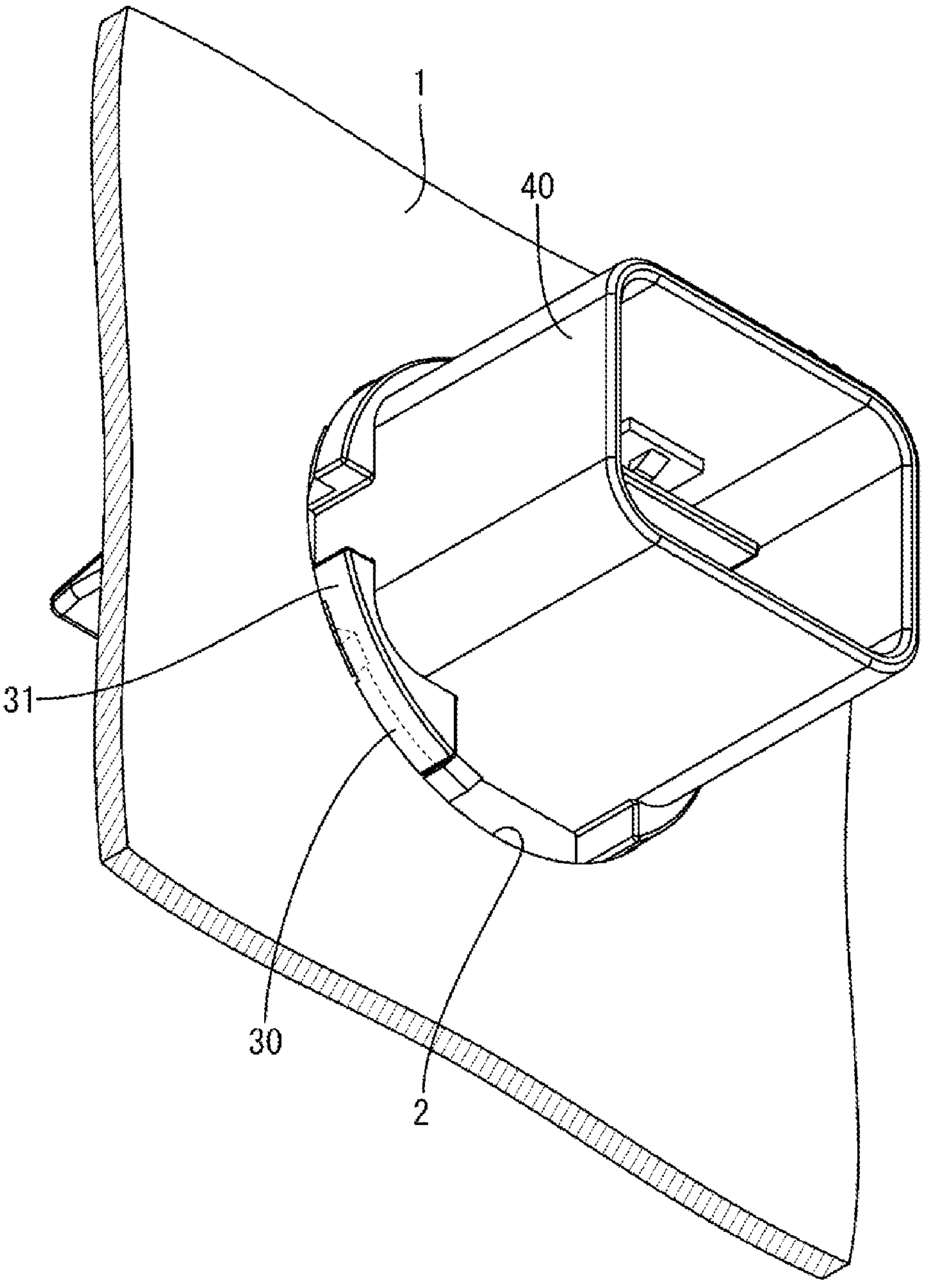
FIG. 22 is a perspective view of the panel attachment connector at the attachment completion position as viewed obliquely from below.
Figure 23:
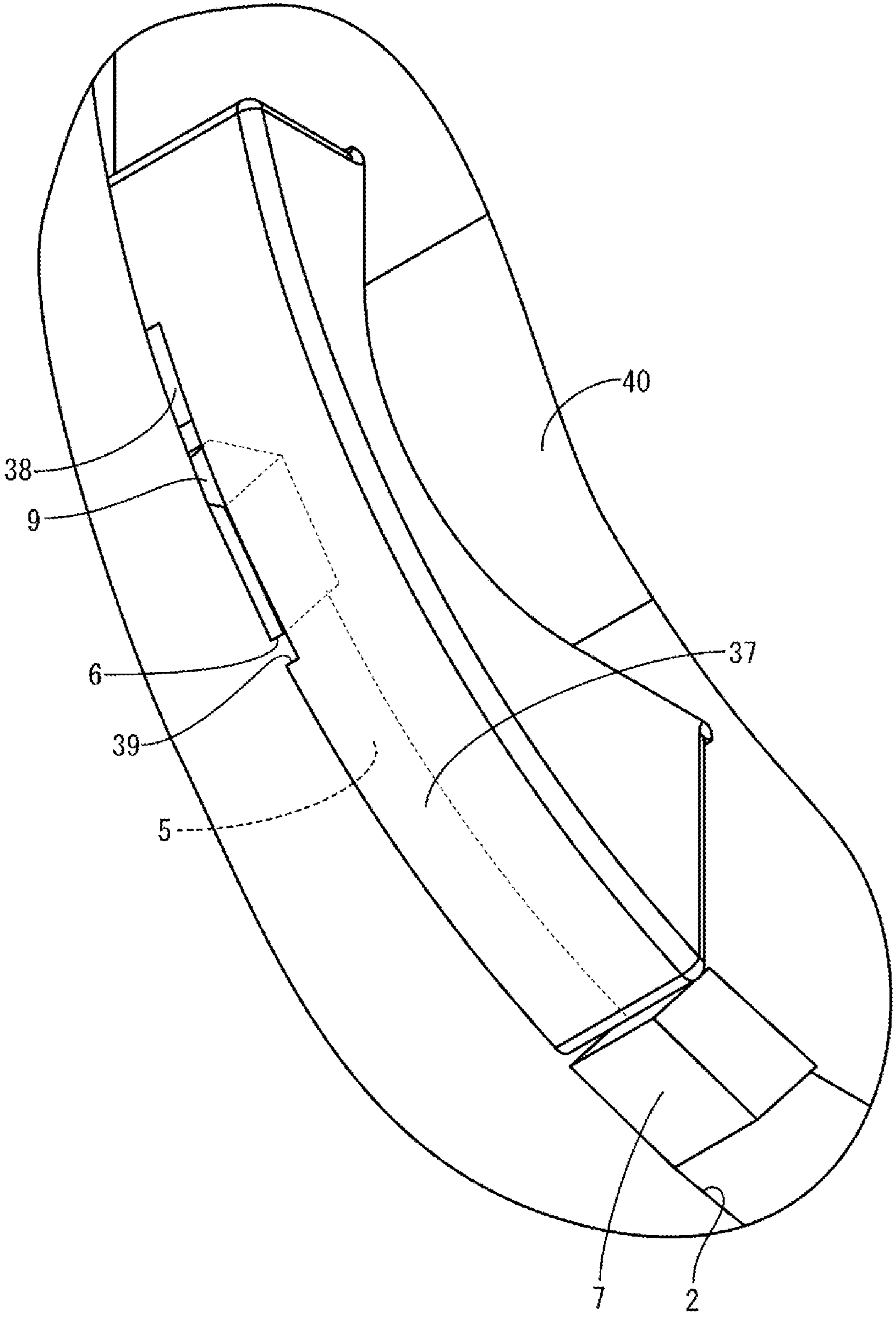
FIG. 23 is an enlarged perspective view of a portion shown in FIG. 22.

When the housing 20 moving from the attachment start position shown in FIG. 17 reaches the attachment completion position shown in FIG. 10, the rotation stopper 7 of the panel 1 comes into contact with the corresponding abutting portion 37 and thus stops rotation of the housing 20 (see FIGS. 8, 22, and 23). It is also possible to determine that the housing 20 has reached the attachment completion position based on the fact that the vertexes of the marks 8 and 34 are aligned as shown in FIG. 4.

In the state where the housing 20 has reached the attachment completion position, the lock protrusions 5 come into contact with the abutting portions 37 due to elasticity of the face seal 83 compressed between the rear end portion of the panel hood 3 and the second seal surface 36, and the housing 20 is fixed in the state of being kept from rotating relative to the panel 1 due to a frictional force acting between the lock protrusions 5 and the abutting portions 37.

Description of Operations of Panel Attachment Connector

Next, operations of the panel attachment connector 10 will be described. In order to attach the panel attachment connector 10 to the panel 1, the housing 20 is arranged in such a manner that the lock protrusions 5 are located at the entrances 38A in a front view as shown in FIG. 11, and the panel fitting portion 30 is inserted into the connector attachment hole 2 from behind. At this time, the lock receiving portions 31 of the panel fitting portion 30 fit along the inner wall 4 of the connector attachment hole 2, and the shaft seal 81 of the seal ring 80 fits to the inner circumferential surface of the panel hood 3 as shown in FIG. 12. As a result, the shaft seal 81 is compressed in the radial direction between the inner circumferential surface of the panel hood 3 and the first seal surface 35 of the seal attachment portion 32, and the lips 84 are crushed. At this time, the face seal 83 is not compressed in the front-rear direction between the rear end portion of the panel hood 3 and the second seal surface 36 of the seal attachment portion 32.

When the lock protrusions 5 are placed at starting ends of the inlet grooves 38 via the entrances 38A, the housing 20 is at the attachment start position. When the housing 20 is rotated from the attachment start position toward the attachment completion position, tapered surfaces of the lock protrusions 5 slide on the corresponding abutting portions 37, and the lock protrusions 5 move onto the abutting portions 37. As the lock protrusions 5 move onto the abutting portions 37, the face seal 83 is compressed in the front-rear direction between the rear end portion of the panel hood 3 and the second seal surface 36 of the seal attachment portion 32, and the lock protrusions 5 slide on the abutting portions 37 as the housing 20 is rotated. When the housing 20 reaches the attachment completion position, the housing 20 is kept at the attachment completion position by a frictional force acting between the lock protrusions 5 and the corresponding abutting portions 37, and the engagement portions 6 can be engaged with the corresponding engaged portions 39. Even if a force is applied to the housing 20 in the direction from the attachment completion position toward the attachment start position in this state, the engagement portions 6 engage with the engaged portions 39, and therefore, unintentional rotation of the housing 20 can be suppressed.

Functions and Effects of Panel Attachment Connector

The panel attachment connector 10 according to the present disclosure is configured to be attached to the panel 1 including the connector attachment hole 2 that has a circular shape in a front view. The panel attachment connector 10 includes the housing 20 and the seal ring 80. The panel 1 includes the panel hood 3 protruding backward from an outer circumferential edge of the connector attachment hole 2 and the lock protrusion 5 protruding radially inward from the inner wall 4 that constitutes the connector attachment hole 2. The housing 20 includes the panel fitting portion 30 that fits to the inner wall 4 of the connector attachment hole 2 and the connector hood 40 that protrudes forward from the panel fitting portion 30. The panel fitting portion 30 includes the lock receiving portion 31 configured to receive the lock protrusion 5 and the seal attachment portion 32 to which the seal ring 80 is attached. The seal attachment portion 32 includes the first seal surface 35 and the second seal surface 36. The seal ring 80 is compressed between an inner circumferential surface of the panel hood 3 and the first seal surface 35 and between a rear end portion of the panel hood 3 and the second seal surface 36. An outer circumferential surface of the lock receiving portion 31 is continuous to and flush with the first seal surface 35. The lock protrusion 5 and the lock receiving portion 31 come into contact with each other due to elasticity of the compressed seal ring 80. The housing 20 is fixed to the panel 1 due to a frictional force acting between the lock protrusion 5 and the lock receiving portion 31.

The seal ring 80 serves as the shaft seal 81 by being compressed between the first seal surface 35 and the inner circumferential surface of the panel hood 3, and also serves as the face seal 83 by being compressed between the second seal surface 36 and the rear end portion of the panel hood 3. High waterproof performance can be obtained by the combination of the shaft seal 81 and the face seal 83. Also, wobbling can be suppressed because the lock protrusion 5 and the lock receiving portion 31 come into contact with each other due to elasticity of the compressed seal ring 80. Furthermore, the outer circumferential surface of the lock receiving portion 31 is continuous to and flush with the first seal surface 35, and accordingly, the lock receiving portion 31 is within the height range of the first seal surface 35, and the housing 20 can be downsized.

In a preferable configuration, the housing 20 is rotatable relative to the panel 1 between the attachment start position and the attachment completion position, one of the lock protrusion 5 and the lock receiving portion 31 includes the engagement portion 6, and the other of the lock protrusion 5 and the lock receiving portion 31 includes the engaged portion 39 configured to engage with the engagement portion 6 to suppress rotation of the housing 20 from the attachment completion position toward the attachment start position.

The housing 20 is kept at the attachment completion position by a frictional force acting between the lock protrusion 5 and the lock receiving portion 31, but the housing 20 may rotate from the attachment completion position toward the attachment start position when a force larger than the frictional force is applied to the housing 20. Therefore, the engagement portion 6 is provided in one of the lock protrusion 5 and the lock receiving portion 31 and the engaged portion 39 is provided in the other of the lock protrusion 5 and the lock receiving portion 31 to suppress rotation of the housing toward the attachment start position through engagement between the engagement portion 6 and the engaged portion 39.

In a preferable configuration, the panel fitting portion 30 has a circular shape in the front view, the connector hood 40 has a rectangular shape in the front view, a diagonal dimension of the connector hood 40 in the front view is not larger than a diameter of the panel fitting portion 30 and is almost the same as the diameter of the panel fitting portion 30, an outer surface of the connector hood 40 includes the two first flat surfaces 41, the two second flat surfaces 42, and the four curved surfaces 43 connecting the flat surfaces, the lock receiving portion 31 includes the entrance 38A that allows the lock protrusion 5 to pass therethrough to arrange the housing 20 at the attachment start position, and the entrance 38A is provided at a position corresponding to any of the first flat surfaces 41 and the second flat surfaces 42 in the front view.

The diagonal dimension of the connector hood 40 is not larger than the diameter of the panel fitting portion 30 and is almost the same as the diameter of the panel fitting portion 30. With this configuration, it is possible to downsize the panel fitting portion 30 as far as possible. Also, the entrance 38A of the lock receiving portion 31 is provided at a position corresponding to any of the flat surfaces 41 and 42 of the connector hood 40 in the front view. Therefore, it is possible to provide the entrance 38A of the lock receiving portion 31 by effectively using a region between the flat surface 41 or 42 of the connector hood 40 and the outer circumferential surface of the lock receiving portion 31.

In a preferable configuration, the housing 20 is inserted into the connector attachment hole 2 from behind, and is fixed to the panel 1 in such a manner that the connector hood 40 protrudes forward from the panel 1.

When the housing 20 is inserted into the connector attachment hole 2 from behind, the housing 20 can be kept from falling off to the front of the connector attachment hole 2.

Other Embodiments (1) In the above embodiment, the seal ring 80 including the protective wall 82 is described as an example, but a configuration is also possible in which the seal ring does not include the protective wall.

(2) In the above embodiment, the housing 20 rotatable relative to the panel 1 is described as an example, but a configuration is also possible in which the lock protrusions and the lock receiving portions are kept in contact with each other by a flexural lock piece when the housing is merely inserted into the panel from behind, for example.

(3) In the above embodiment, a configuration is described as an example in which bottom surfaces of the entrances 38A are continuous to and flush with the flat surfaces 41 and 42 of the connector hood 40, but a configuration is also possible in which steps are formed between the bottom surfaces and the flat surfaces 41 and 42.

(4) In the above embodiment, a configuration is described as an example in which the housing 20 is inserted into the connector attachment hole 2 from behind, but the housing 20 may be inserted into the connector attachment hole 2 from the front side.

LIST OF REFERENCE NUMERALS

- 1: panel, 2: connector attachment hole, 3: panel hood, 4: inner wall, 5: lock protrusion, 6: engagement portion, 7: rotation stopper, 8: mark, 9: tapered surface
- 10: panel attachment connector
- 20: housing
- 30: panel fitting portion, 31: lock receiving portion; 32: seal attachment portion, 33: flange, 34: mark, 35: first seal surface; 36: second seal surface, 37: abutting portion, 38: inlet groove, 38A: entrance, 39: engaged portion
- 40: connector hood, 41: first flat surface, 42: second flat surface, 43: curved surface
- 50: terminal housing portion, 51: cavity, 52: lance
- 60: front retainer, 61: lock piece
- 70: movable plate, 71: insertion hole
- 80: seal ring, 81: shaft seal, 82: protective wall, 83: face seal, 84: lip

What is claimed is:

1. A panel attachment connector configured to be attached to a panel including a connector attachment hole that has a circular shape in a front view, the panel attachment connector comprising:

a housing; and a seal ring, wherein the panel includes:

a panel hood protruding backward from an outer circumferential edge of the connector attachment hole; and a lock protrusion protruding radially inward from an inner wall that constitutes the connector attachment hole, the housing includes:

a panel fitting portion that fits to the inner wall of the connector attachment hole; and a connector hood protruding forward from the panel fitting portion, the panel fitting portion includes:

a lock receiving portion configured to receive the lock protrusion; and a seal attachment portion to which the seal ring is attached, the seal attachment portion includes:

a first seal surface; and a second seal surface, the seal ring is compressed between an inner circumferential surface of the panel hood and the first seal surface and between a rear end portion of the panel hood and the second seal surface, an outer circumferential surface of the lock receiving portion is continuous to and flush with the first seal surface, the lock receiving portion includes:

an abutting portion capable of coming into contact with the lock protrusion in a front-rear direction; and an inlet groove that allows the lock protrusion to move therethrough to a position where the lock protrusion is capable of coming into contact with the abutting portion, the inlet groove extends in a circumferential direction, the lock protrusion and the abutting portion come into contact with each other due to elasticity of the compressed seal ring, and the housing is fixed to the panel due to a frictional force acting between the lock protrusion and the abutting portion, the housing is rotatable relative to the panel between an attachment start position and an attachment completion position, one of the lock protrusion and the lock receiving portion includes an engagement portion, and the other of the lock protrusion and the lock receiving portion includes an engaged portion configured to engage with the engagement portion to suppress rotation of the housing from the attachment completion position toward the attachment start position, the panel fitting portion has a circular shape in the front view, and the connector hood has a rectangular shape in the front view, a diagonal dimension of the connector hood in the front view is not larger than a diameter of the panel fitting portion and is approximately equal to the diameter of the panel fitting portion, an outer surface of the connector hood includes four flat surfaces and four curved surfaces connecting the flat surfaces, the lock receiving portion includes an entrance that allows the lock protrusion to pass therethrough to arrange the housing at the attachment start position, and the entrance is provided at a position corresponding to any of the flat surfaces in the front view, and the entrance is open forward in a front surface of the lock receiving portion, and the connector hood protrudes forward from the front surface of the lock receiving portion.

2. The panel attachment connector according to claim 1, wherein the housing is configured to be inserted into the connector attachment hole from behind and to be fixed to the panel in such a manner that the connector hood protrudes forward from the panel.

* * * * *